(12) United States Patent
Fukuhara et al.

(10) Patent No.: US 9,064,294 B2
(45) Date of Patent: Jun. 23, 2015

(54) IMAGE PROCESSING APPARATUS AND METHOD

(71) Applicant: Sony Corporation, Tokyo (JP)

(72) Inventors: Takahiro Fukuhara, Kanagawa (JP); Katsutoshi Ando, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 192 days.

(21) Appl. No.: 13/693,571

(22) Filed: Dec. 4, 2012

(65) Prior Publication Data

US 2013/0163889 A1  Jun. 27, 2013

(30) Foreign Application Priority Data

Dec. 7, 2011  (JP) ................ 2011-267561

(51) Int. Cl.
*G06K 9/36* (2006.01)
*G06T 9/00* (2006.01)

(52) U.S. Cl.
CPC ....................... *G06T 9/00* (2013.01)

(58) Field of Classification Search
USPC .......................... 382/232, 233, 236
See application file for complete search history.

(56) References Cited

U.S. PATENT DOCUMENTS 7,590,294 B2 * 9/2009 Fukuhara et al. ............. 382/232

FOREIGN PATENT DOCUMENTS

WO   WO 2007/058296   5/2007

OTHER PUBLICATIONS

SMPTE Standard, Material Exchange Format (MXF)—File Format Specification, SMPTE 377-1-2009, May 4, 2009, pp. 1-181.
SMPTE Standard for Television—Material Exchange Format (MXF)—Operational pattern 1A (Single Item, Single Package) SMPTE 378M-2004, Sep. 22, 2004, pp. 1-10.
SMPTE Standard for Television—Material Exchange Format (MXF)—MXF Constrained Generic Container, SMPTE ST 379-2:2010, Feb. 23, 2010, pp. 1-20.
SMPTE Standard, Material Exchange Format—Mapping JPEG 2000 Codestreams into the MXF Generic Container, SMPTE 422M-2006, Aug. 28, 2006, pp. 1-14.

* cited by examiner

*Primary Examiner* — Duy M Dang
(74) *Attorney, Agent, or Firm* — Frommer Lawrence & Haug LLP; William S. Frommer; Ellen Marcie Emas

(57) ABSTRACT

An image processing apparatus processes encoded data obtained by encoding image data for each of line blocks obtained by dividing an image. The image processing apparatus includes: a body-partition generating unit configured to generate body partitions of a file with a predetermined format for each piece of encoded data for one of the line blocks, the body partitions containing the encoded data; and a partition merging unit configured to merge the body partitions generated by the body-partition generating unit, a header partition containing header information, and a footer partition containing footer information to thereby generate the file.

24 Claims, 32 Drawing Sheets

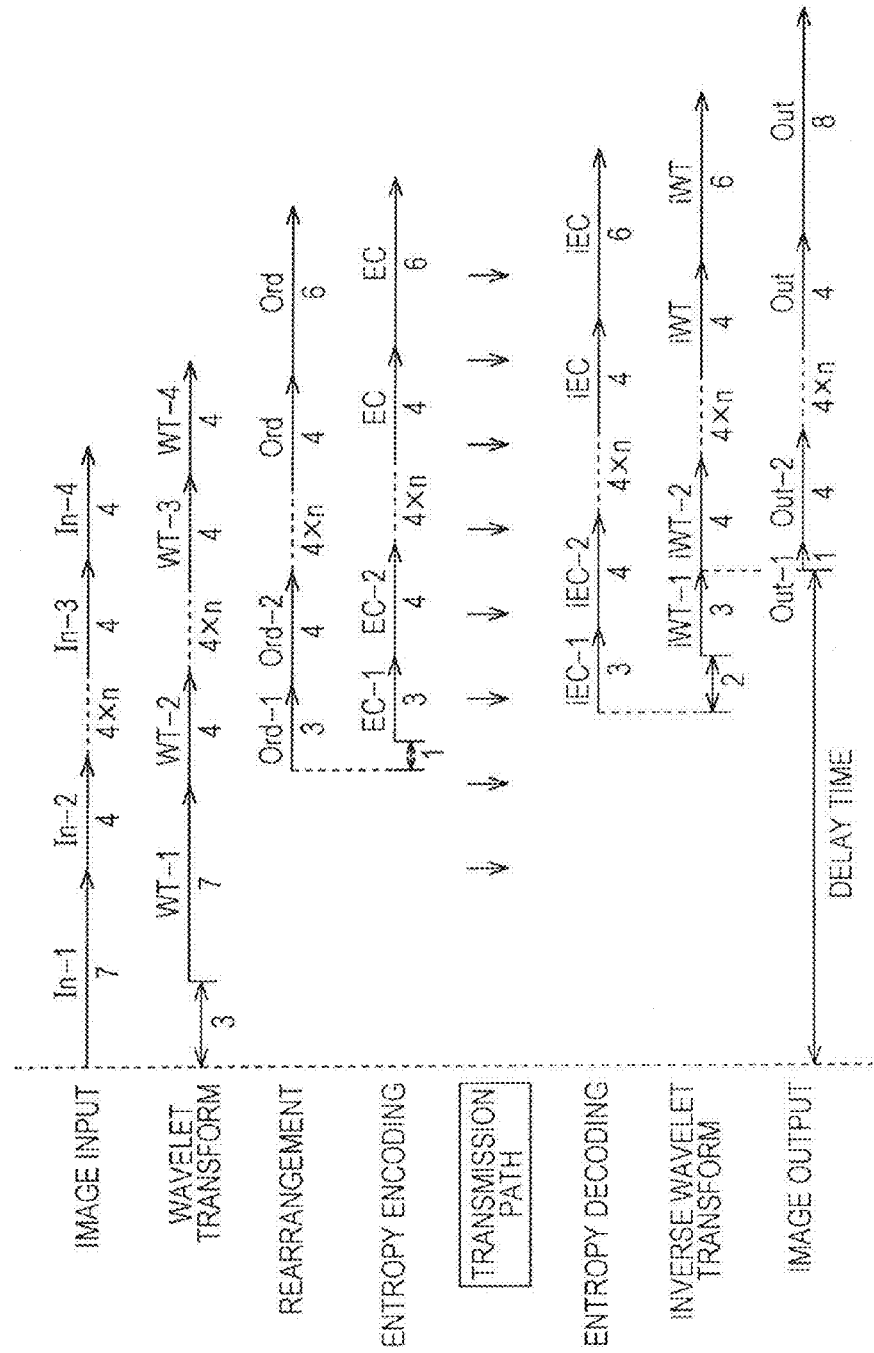

IMAGE PROCESSING APPARATUS AND METHOD

BACKGROUND

The present disclosure relates to image processing apparatuses and image processing methods. In particular, the present disclosure relates to an image processing apparatus and an image processing method that are capable of reducing the amount of delay in file transmission of content, such as image and audio content.

Hitherto, MXF (Material exchange Format) has been available as a standard for a file format for conversion of material, such as images and audio, into a file for transmission (e.g., see SMPTE 377M: The MXF File Format Specification (the overall master document), SMPTE 378M: OP-1a (the layout options for a minimal simple MXF file), SMPTE 379M: Generic Container (the way that essence is stored in MXF files), and SMPTE 422M: Mapping J2K Codestreams into the MXF Generic Container. Uncompressed video data and audio data or video data and audio data encoded by a coding system, such as a JPEG (Joint Photographic Experts Group) or MPEG (Moving Picture Experts Group) coding system, are converted (wrapped) into a file in MXF in conjunction with metadata and the file is transmitted. Such an arrangement enables data transmission between pieces of equipment that are capable of exchanging files that comply with the MXF standard. The arrangement, therefore, can realize data transmission that has a high degree of freedom and that is independent of a coding technology, thus allowing content data to be easily transmitted between more diversified pieces of equipment.

A method that enables encoding and decoding of an image at higher speed has been proposed (e.g., see International Publication Pamphlet No. WO 2007/058296 A1) as an image encoding system. For transmission of image data, encoding the image data can further reduce the amount of information. For the encoding, use of the encoding system can reduce the amount of delay in the data transmission. That is, it is possible to further reduce a delay time taken from when image data is obtained until encoding, transmission, decoding of the image data, reproduction of the resulting decoded image, and recording of the decoded image data are performed.

However, in the case of the typical MXF standard, no consideration has been given to a low-delay encoding system as described in International Publication Pamphlet No. WO 2007/058296 A1 and it has been difficult to realize lower-delay data transmission.

SUMMARY

Accordingly, it is desirable to realize a high degree of freedom and a lower delay with respect to transmission of data, such as image and audio data.

According to one embodiment of the present disclosure, there is provided an image processing apparatus that processes encoded data obtained by encoding image data for each of line blocks obtained by dividing an image. The image processing apparatus includes: a body-partition generating unit configured to generate body partitions of a file with a predetermined format for each piece of encoded data for one of the line blocks, the body partitions containing the encoded data; and a partition merging unit configured to merge the body partitions generated by the body-partition generating unit, a header partition containing header information, and a footer partition containing footer information to thereby generate the file.

The body-partition generating unit may generate one body partition containing the encoded data with respect to the file so as to wrap the encoded data for one line block into the file.

The body-partition generating unit may generate a body partition containing the encoded data, a body partition containing an index table segment, and a body partition containing header metadata in that order and may arrange the body partitions in that order.

The image processing apparatus may further include a footer-partition generating unit configured to generate the footer partition. The body-partition generating unit may generate a body partition containing the encoded data and a body partition containing an index table segment in that order and may arrange the body partitions in that order, and the footer-partition generating unit may generate a footer partition containing header metadata.

The image processing apparatus may further include a footer-partition generating unit configured to generate the footer partition. The body-partition generating unit may generate a body partition containing the encoded data, and the footer-partition generating unit may generate a footer partition containing header metadata and an index table segment.

The body-partition generating unit may generate body partitions containing the encoded data with respect to the file and may arrange the body partitions so that the encoded data for the line blocks is wrapped into the file.

The body-partition generating unit may generate, for each line block, a body partition containing the encoded data, a body partition containing an index table segment, and a body partition containing header metadata in that order and may arrange the body partitions in that order.

The image processing apparatus may further include a footer-partition generating unit configured to generate the footer partition. With respect to each line block except a last one of the line blocks, the body-partition generating unit may generate a body partition containing the encoded data, a body partition containing an index table segment, and a body partition containing header metadata in that order and may arrange the body partitions in that order. With respect to the last line block, the body-partition generating unit may generate a body partition containing the encoded data and a body partition containing the index table segment in that order and may arrange the body partitions in that order. The footer-partition generating unit may generate a footer partition containing header metadata of the last line block.

The image processing apparatus may further include a footer-partition generating unit configured to generate the footer partition. With respect to each line block except a last one of the line blocks, the body-partition generating unit may generate a body partition containing the encoded data, a body partition containing an index table segment, and a body partition containing header metadata in that order and may arrange the body partitions in that order. With respect to the last line block, the body-partition generating unit may generate a body partition containing the encoded data. The footer-partition generating unit may generate a footer partition containing header metadata and an index table segment of the last line block.

The image processing apparatus may further include an encoder configured to encode the image data for each line block. The body-partition generating unit may generate the body partitions containing encoded data obtained by encoding the image data for each line block, the encoding being performed by the encoder.

The encoder may include: a wavelet-transform unit configured to perform wavelet transform on the image data for each line block; and an entropy encoding unit configured to perform entropy encoding on coefficient data obtained by the wavelet transform performed by the wavelet-transform unit.

The line block may be a pixel data group for a number of lines that the wavelet-transform unit uses to generate coefficient data for one line of a subband of lowest-frequency components after the wavelet transform.

The predetermined format may be an MXF according to an SMPTE standard.

According to one embodiment of the present disclosure, there is provided an image processing method for an image processing apparatus that processes encoded data obtained by encoding image data for each of line blocks obtained by dividing an image. The image processing method includes: causing a body-partition generating unit to generate body partitions of a file with a predetermined format for each piece of encoded data for one of the line blocks, the body partitions containing the encoded data; and causing a partition merging unit to merge the generated body partitions, a header partition containing header information, and a footer partition containing footer information to thereby generate the file.

According to another embodiment of the present disclosure, there is provided an image processing apparatus that processes encoded data obtained by encoding image data. The image processing apparatus includes: a partition separating unit configured to separate the encoded data into partitions including body partitions of a file in a predetermined format, the body partitions containing the encoded data for one of line blocks obtained by dividing an image; and a body-partition decrypting unit configured to decrypt the body partitions to extract the encoded data for the line block, the body partitions being separated by the partition separating unit.

The body-partition decrypting unit may further decrypt a body partition containing an index table segment and a body partition containing header metadata, the body partitions being separated by the partition separating unit.

The image processing apparatus may further include a decoder configured to decode the encoded data for one line block, the encoded data being decrypted and extracted by the body-partition decrypting unit.

The decoder may include: an entropy decoding unit configured to perform entropy decoding on the encoded data to generate coefficient data; and an inverse-wavelet-transform unit configured to perform inverse wavelet transform on the coefficient data generated by the decoding performed by the entropy decoding unit.

The predetermined format may an MXF according to an SMPTE standard.

According to another embodiment of the present disclosure, there is provided an image processing method for an image processing apparatus that processes encoded data obtained by encoding image data. The image processing method includes: causing a partition separating unit to separate the encoded data into partitions including body partitions of a file in a predetermined format, the body partitions containing the encoded data for one of line blocks obtained by dividing an image; and a body-partition decrypting unit configured to decrypt the separated body partitions to extract the encoded data for the line block.

According to one embodiment of the present disclosure, there is provided a technology for processing encoded data obtained by encoding image data for each of line blocks obtained by dividing an image. Body partitions of a file with a predetermined format are generated for each piece of encoded data for one of the line blocks, the body partitions containing the encoded data. Further, the generated body partitions, a header partition containing header information, and a footer partition containing footer information are merged together to thereby generate the file.

According to another embodiment of the present disclosure, there is provided a technology for processing encoded data obtained by encoding image data. The encoded data is separated into partitions including body partitions of a file in a predetermined format, the body partitions containing the encoded data for one of line blocks obtained by dividing an image. Further, the separated body partitions are decrypted to extract the encoded data for the line block.

According to the present disclosure, images can be processed. In particular, it is possible to achieve a higher degree of freedom and a lower delay with respect to transmission of data, such as image and audio data.

BRIEF DESCRIPTION OF THE DRAWINGS

FIG. 8 schematically illustrates exemplary parallel operations of elements for encoding and decoding;

DETAILED DESCRIPTION OF EMBODIMENTS

Modes (herein referred to as "embodiments") for implementing the present disclosure will be described below. A description below is given in the following order 1. First Embodiment (Image Encoding Apparatus)
2. Second Embodiment (Image Decoding Apparatus)
3. Third Embodiment (Personal Computer)

1. First Embodiment

Image Encoding Apparatus

Figure 1:
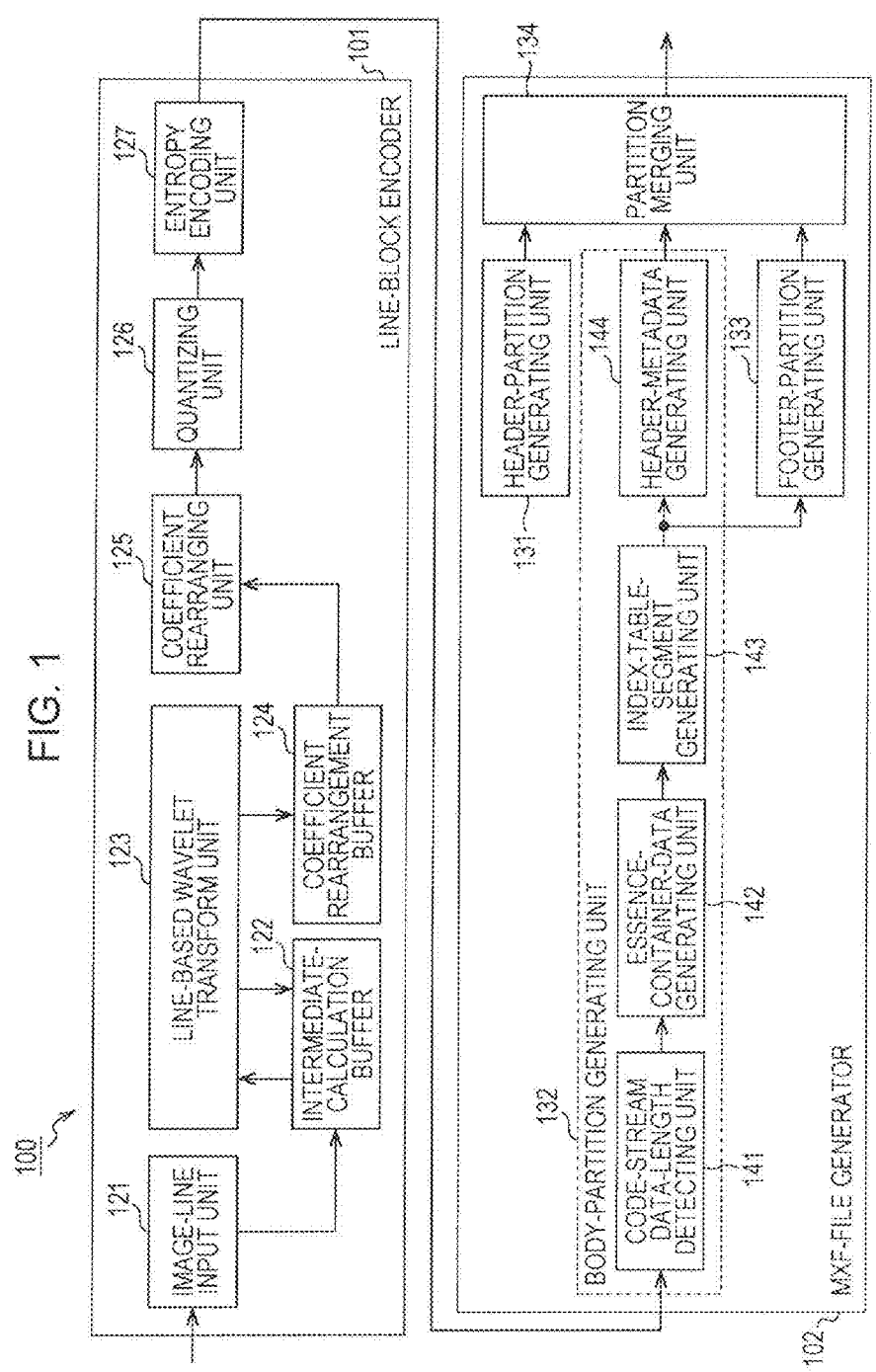
FIG. 1 is a block diagram illustrating a major configuration example of an image encoding apparatus.

FIG. 1 is a block diagram illustrating a major configuration example of an image encoding apparatus. An image encoding apparatus 100 illustrated in FIG. 1 serves as an image processing apparatus that encodes image data, converts the encoded data into an MXF (Material eXchange Format) file, and outputs the MXF file.

As illustrated in FIG. 1, the image encoding apparatus 100 has a line-block encoder 101 and an MXF-file generator 102.

The line-block encoder 101 encodes input image data with low delay. More specifically, the line-block encoder 101 performs encoding for each of multiple line blocks (described below) obtained by dividing each picture of image data of a moving image.

The MXF-file generator 102 sequentially converts the encoded data (a code stream) for each line block, the encoded data being output from the line-block encoder 101, into an MXF file so that an increase in delay is suppressed and outputs the MXF file.

MXF is a transmission file format for transmitting data of content, such as image and audio content. For example, the MXF is used to transmit data of digital video and audio between pieces of equipment, such as a camcorder and an editing apparatus used at a broadcast station and so on.

In the past, data of content, such as image and audio content was exchanged between apparatuses via a tape device or the like. However, with an improvement of the information processing technology, those apparatuses have been connected to general-purpose networks through which data has been exchanged. As a result, data is exchanged between more diverse apparatuses.

The MXF is a file format having a property that is similar to a "container" or "wrapper" for wrapping video data and audio data together with metadata. The MXF is standardized so as to address various problems with non-professional applications and fully supports timecode and metadata, aiming for a future standard for professional applications.

The MXF is designed as a wide-ranging standard that has a high degree of freedom and that is independent of any particular video or audio compression technique (codec). That is, the MXF enables a code stream, encoded by an arbitrary encoding system, to be converted into a file. That is, for a code stream based on any encoding system, the MXF can easily realize data transmission between apparatuses that can process an MXF file. Accordingly, the use of the MXF file format makes it possible to easily transmit more various types of data between more diversified apparatuses, without preparing an interface adapted for the encoding system. That is, the MXF realizes a higher degree of freedom in data transmission.

Hitherto, for conversion of video data into a file by using the MXF, the conversion has been performed using a large data unit, such as a sequence or a picture. In such a case, however, the conversion of encoded data into the file causes a large amount of delay. Thus, even when encoding is performed with low delay as in the encoding using the line-block encoder 101, there has been a possibility that the conversion into the file causes an increase in the delay time to thereby make it difficult to realize low-delay data transmission.

Accordingly, the MXF-file generator 102 converts the encoded data, generated by the line-block encoder 101, into a file so that an increase in the delay time is minimized and transmits the file.

Details of the individual units will be described below.

[Line-Block Encoder]

First, a description will be give of the line-block encoder 101. As illustrated in FIG. 1, the line-block encoder 101 includes an image-line input unit 121, an intermediate-calculation buffer 122, a line-based wavelet transform unit 123, a coefficient rearrangement buffer 124, a coefficient rearranging unit 125, a quantizing unit 126, and an entropy encoding unit 127.

The image-line input unit 121 receives input moving-image data for each line. The image-line input unit 121 supplies the input image data for each line to the intermediate-calculation buffer 122, which holds the image data.

The line-based wavelet transform unit 123 performs wavelet transform on the image data accumulated in the intermediate-calculation buffer 122. That is, the line-based wavelet transform unit 123 reads the image data from the intermediate-calculation buffer 122, performs filter processing using analysis filters to generate data of coefficients of low-frequency components and high-frequency components, and stores the generated coefficient data in the intermediate-calculation buffer 122. The line-based wavelet transform unit 123 has a horizontal analysis filter and a vertical analysis filter and performs analysis filter processing on a group of image data in both the horizontal direction and vertical direction of a screen. The line-based wavelet transform unit 123 re-reads the low-frequency-component coefficient data stored in the intermediate-calculation buffer 122 and performs filter processing on the read coefficient data by using the analysis filters to thereby further generate data of coefficients of high-frequency components and low-frequency components. The generated coefficient data is stored in the intermediate-calculation buffer 122.

The line-based wavelet transform unit 123 recursively repeats the processing on low-frequency components. When the decomposition level reaches a predetermined level, the line-based wavelet transform unit 123 reads the coefficient data from the intermediate-calculation buffer 122 and writes the read coefficient data to the coefficient rearrangement buffer 124.

The coefficient rearranging unit 125 reads the coefficient data, written to the coefficient rearrangement buffer 124, in a predetermined order and supplies the read coefficient data to the quantizing unit 126. The quantizing unit 126 quantizes the supplied coefficient data and supplies the resulting coefficient data to the entropy encoding unit 127.

The entropy encoding unit 127 encodes the supplied coefficient data by using a predetermined entropy coding system, such as Huffman coding or arithmetic coding. The entropy encoding unit 127 outputs the generated encoded data (a code stream) to the MXF-file generator 102.

[Wavelet Transform]

Processing performed by the line-based wavelet transform unit 123 will be described in more detail. Wavelet transform will be briefly described first.

Figure 2:
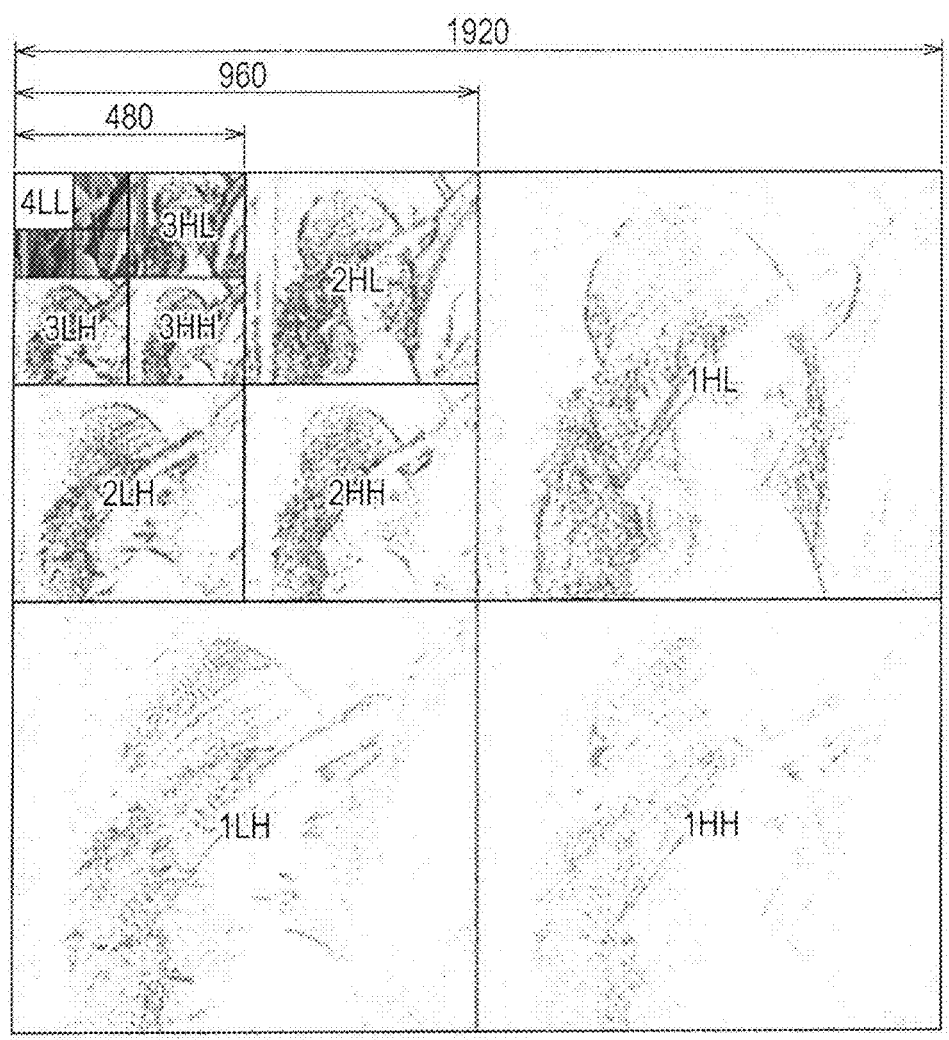
FIG. 2 illustrates subbands.

As schematically illustrated in FIG. 2, in wavelet transform performed on the image data, processing for decomposing image data into high-spatial-frequency bands and low-spatial-frequency bands is recursively repeated on low-spatial-frequency band data resulting from the decomposition. Such processing is performed to thereby concentrate data in a low-spatial-frequency band into a smaller region, thus making it possible to perform efficient compression coding.

FIG. 2 illustrates subbands generated when an image with a horizontal width of 1920 pixels is wavelet-decomposed four times (i.e., up to decomposition level 4). In FIG. 2, character "H" represents high-frequency components and "L" represents low-frequency components. In the order of "L" and "H", the front side indicates a band resulting from horizontal decomposition and the rear side indicates a band resulting from vertical decomposition. Numbers preceding "L" and "H" represent decomposition levels in the corresponding regions. The lowest-frequency band is 4LL.

Figure 3:
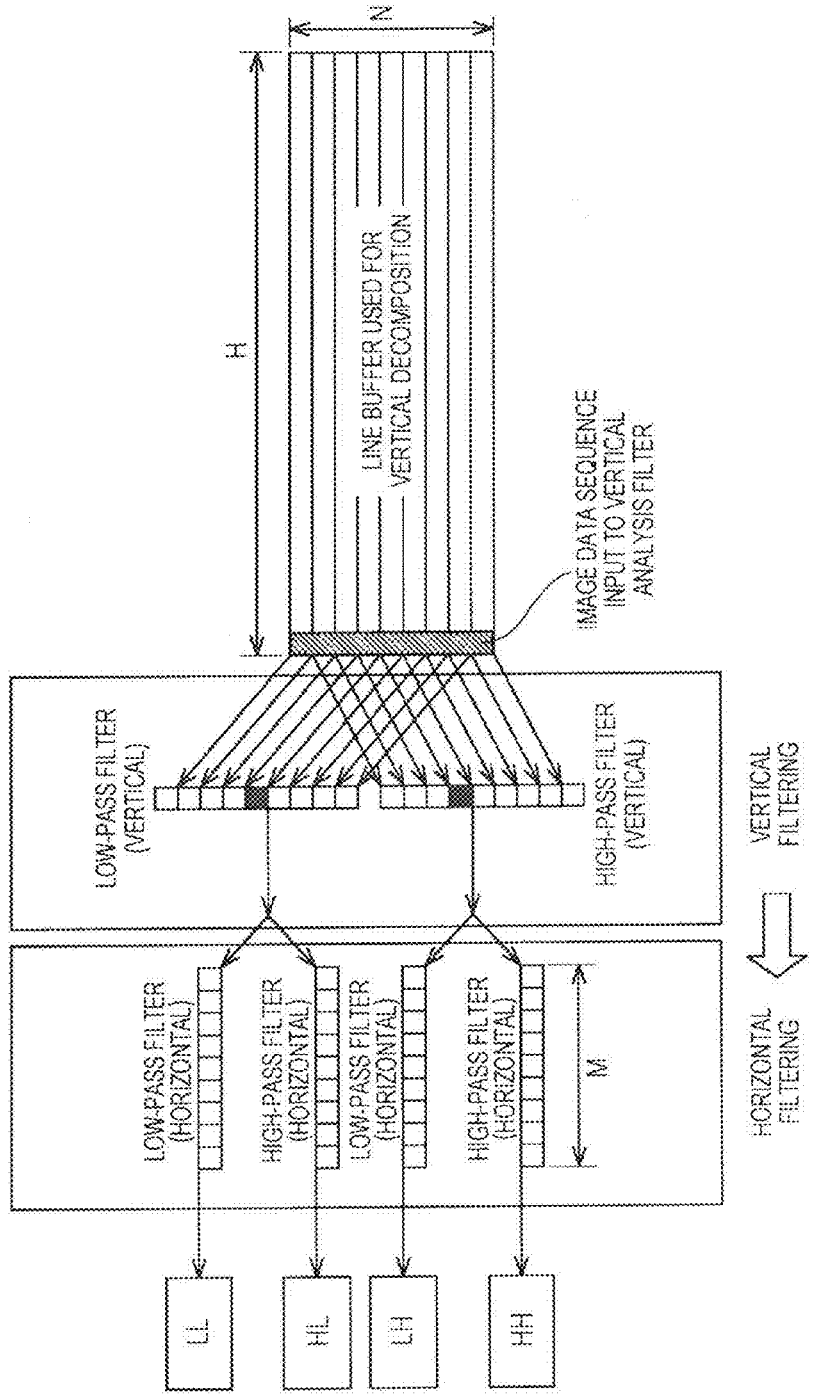
FIG. 3 illustrates wavelet transform.

As illustrated in FIG. 3, when an input image corresponding to N lines is accumulated, the line-based wavelet transform unit 123 executes vertical filtering for decomposing a group of coefficients, arranged in the vertical direction, into high-frequency components and low-frequency components. This vertical filtering is executed while being shifted from the left end to the right end of the screen, so that a group of horizontally arranged coefficients of the high-frequency components and the low-frequency components are generated.

The line-based wavelet transform unit 123 then executes horizontal filtering on the components arranged in the horizontal direction. As a result, two-dimensional subbands (LL, HL, LH, and HH components) are generated. The line-based wavelet transform unit 123 continues the above-described operation up to the bottom portion of the screen to thereby generate single-decomposition wavelet transform coefficients (1LL, 1HL, 1LH, and 1HH).

A method using a 5×3 filter will be described next as a specific example of the wavelet transform. The method using a 5×3 filter is also employed in the JPEG 2000 standard described above in the related art and is advantageous in that wavelet transform can be performed with a smaller number of filter taps.

An impulse response (Z transform representation) of the 5×3 filter is constituted by a low-pass filter $H_0(z)$ and a high-pass filter $H_1(z)$, as noted in equations (1) and (2) below. Equations (3) and (4) show that the low-pass filter $H_0(z)$ has five taps and the high-pass filter $H_1(z)$ has three taps.

$$H_0(z)=(-1+2z^{-1}+6z^{-2}+2z^{-3}-z^{-4})/8 \quad (1)$$

$$H_1(z)=(-1+2z^{-1}-z^{-2})/2 \quad (2)$$

According to equations (1) and (2), coefficients of low-frequency components and high-frequency components can be directly determined. In this case, use of a lifting technique makes it possible to reduce the amount of calculation in the filter processing. Processing at the analysis filter for performing wavelet transform when the lifting technique is applied to a 5×3 filter will be briefly described with reference to FIG. 4.

Figure 4:
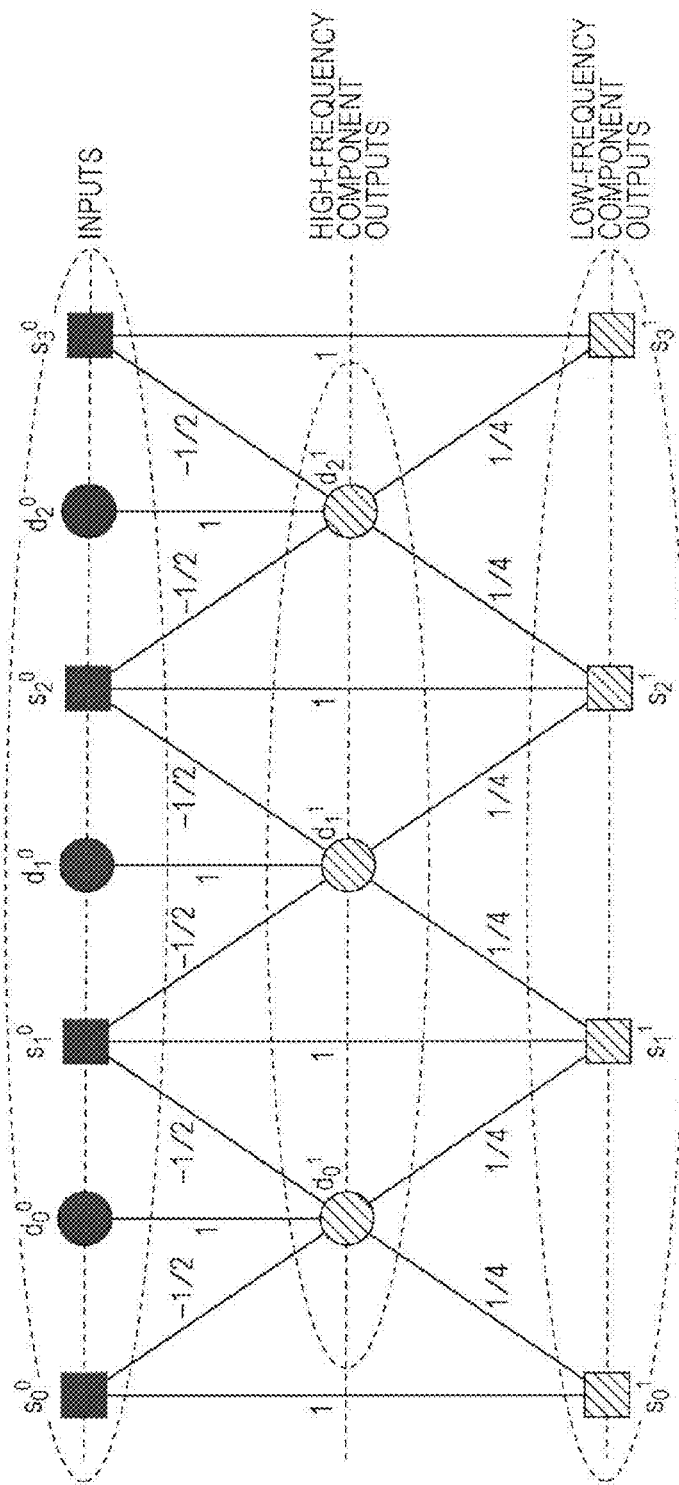
FIG. 4 is a schematic diagram schematically illustrating wavelet transform when a lifting technique is applied to a 5×3 filter.

In FIG. 4, the top portion, the middle portion, and the bottom portion indicate a pixel row of an input image, high-frequency-component outputs, and low-frequency-component outputs, respectively. The top portion may indicate coefficients obtained by the above-described filter processing, instead of the pixel row of an input image. In this case, the top portion indicates a pixel row of an input image, solid squares indicate even-numbered pixels or lines (starting at the zeroth pixel or line), and solid circles indicate odd-numbered pixels or lines.

First, at a first stage, high-frequency-component coefficients $d_i^1$ are generated from the input pixel row in accordance with equation (3):

$$d_i^1=d_i^0-\frac{1}{2}(s_i^0+s_{i+1}^0) \quad (3)$$

Next, at a second stage, the generated high-frequency component coefficients and the odd-numbered pixels of the input image are used to generate low-frequency-component coefficients $s_i^1$ in accordance with equation (4).

$$s_i^1=s_i^0+\frac{1}{4}(d_{i-1}^1+d_i^1) \quad (4)$$

At the analysis filter, the filter processing is performed to decompose the pixel data of the input image into low-frequency components and high-frequency components, as described above.

Figure 5:
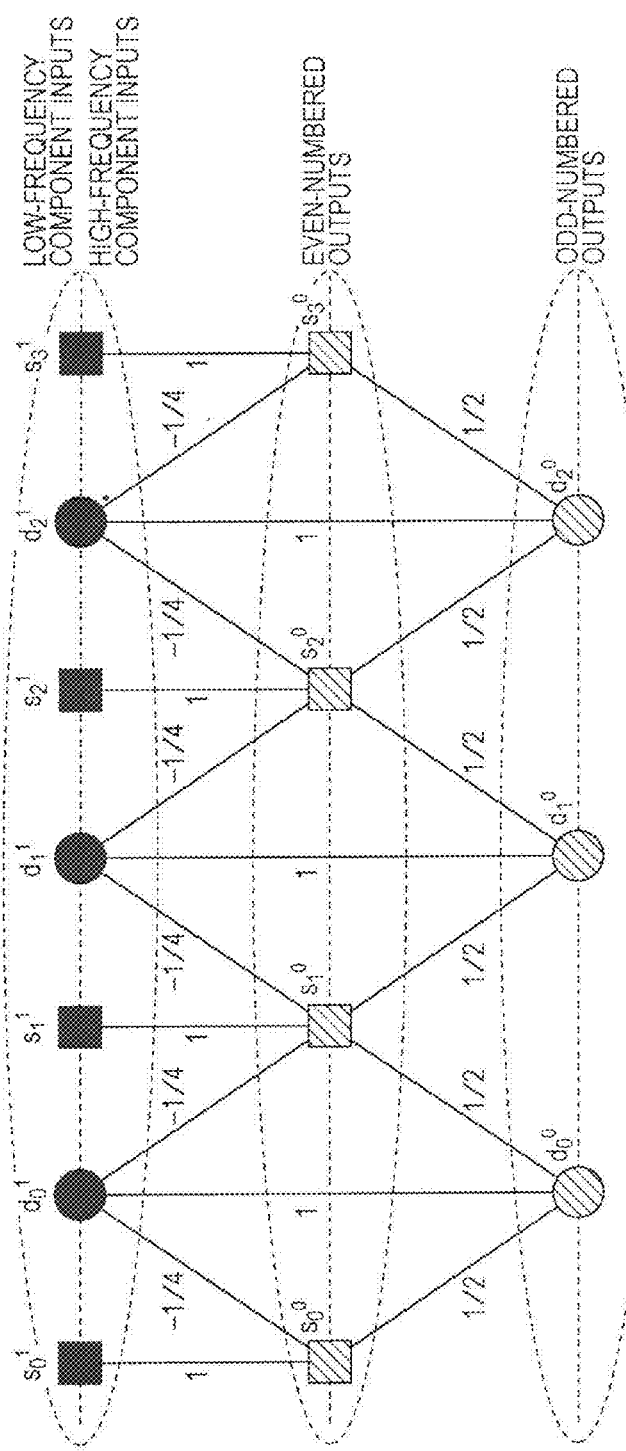
FIG. 5 is a schematic diagram schematically illustrating wavelet transform when the lifting technique is applied to the 5×3 filter.

Processing at a synthesis filter for performing inverse wavelet transform for restoring the coefficients generated by the wavelet transform will be briefly described with reference to FIG. 5. FIG. 5 corresponds to FIG. 4 described above and illustrates an example in which a 5×3 filter is used and the lifting technique is applied. In FIG. 5, the top portion indicates input coefficients generated by the wavelet transform, solid circles indicate coefficients of high-frequency components, and solid squares indicate coefficients of low-frequency components.

First, at a first stage, odd-numbered coefficients $s_i^0$ (starting at the zeroth coefficient) are generated from the input low-frequency-component and high-frequency-component coefficients in accordance with equation (5):

$$s_i^0=s_i^1-\frac{1}{4}(d_{i-1}^1+d_i^1) \quad (5)$$

Next, at a second stage, even-numbered coefficients $d_i^0$ are generated from the even-numbered coefficients $s_i^0$ generated at the first stage described above and the input high-frequency component coefficients $d_i^1$ in accordance with equation (6):

$$d_i^0=d_i^1+\frac{1}{2}(s_i^0+s_{i+1}^0) \quad (6)$$

At the synthesis filter, the filter processing is performed to combine the low-frequency-component coefficients and the high-frequency-component coefficients, as described above, to perform inverse wavelet transform.

Figure 6:
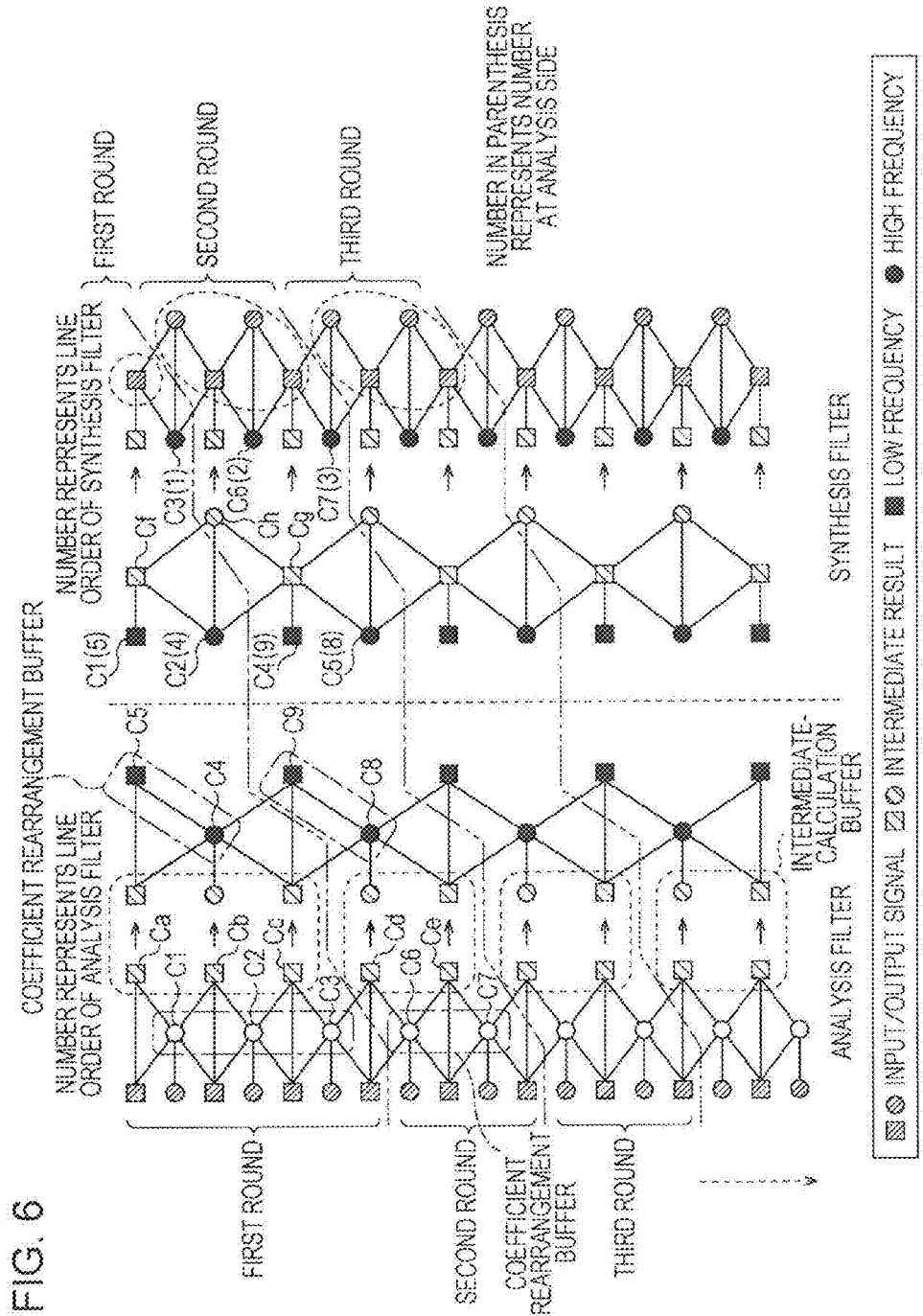
FIG. 6 is a schematic diagram illustrating an example in which filtering based on the lifting using the 5×3 filter is executed up to decomposition level 2.

The method of the wavelet transform will be further described. FIG. 6 illustrates an example in which the filter processing based on the lifting using the 5×3 filter described above with reference to FIG. 4 is executed up to decomposition level 2. A portion denoted as "analysis filter" at the left side in FIG. 6 represents a filter of the line-based wavelet transform unit 123. The portion denoted as "synthesis filter" at the right side in FIG. 6 represents a filter of an inverse-wavelet-transform unit corresponding to the line-based wavelet transform unit 123. FIG. 6 illustrates only vertical filter processing.

The leftmost column in FIG. 6 represents pixel data to be wavelet-transformed. The first to third columns from the left end represent analysis filter processing (vertical filter processing) for decomposition level 1. The second column from the left end represents high-frequency-component outputs of the analysis filter processing and the third column from the left end represents low-frequency-component outputs of the analysis filter processing.

The fourth to sixth columns from the left end represent analysis filter processing (vertical filter processing) for decomposition level 2. The fourth column from the left end represents low-frequency-component outputs (the third column from the left end) for decomposition level 1. That is, the analysis filter processing is recursively repeated on the generated low-frequency components. The fifth column from the left end represents high-frequency-component outputs of the analysis filter processing and the sixth column from the left end represents low-frequency-component outputs of the analysis filter processing.

Coefficient data used for analysis filter processing at a next level is stored in the intermediate-calculation buffer 122. In the case of the example illustrated in FIG. 6, the coefficient data (surrounded by dotted lines) in the third and fourth columns from the left end is stored in the intermediate-calculation buffer 122.

Coefficient data that is not used for the analysis filter processing at the next level is stored in the coefficient rearrangement buffer 124. In the case of the example illustrated in FIG. 6, the coefficient data (surrounded by dashed-dotted lines) in the second, fifth, and sixth columns from the left end is stored in the coefficient rearrangement buffer 124.

The coefficient data that is stored in the coefficient rearrangement buffer 124 as described above is quantized by the quantizing unit 126, the resulting coefficient data is encoded by the entropy encoding unit 127, and the resulting data is transmitted as encoded data (a code stream). At a transmission destination of the encoded data, the encoded data is decoded, is inverse-quantized, and is subjected to inverse wavelet transform (synthesis filter processing).

The right side of a center vertical dotted line in FIG. 6, i.e., the area from the sixth column from the right end to the rightmost column, represents the synthesis filter processing. The fourth to sixth columns from the right end represent synthesis filter processing (vertical filter processing) for decomposition level 2. The sixth column from the right end represents coefficient data to be subjected to inverse wavelet transform. This coefficient data corresponds to the high-frequency-component outputs (the fifth column from the left end in FIG. 6) and the low-frequency-component outputs (the sixth column from the left end in FIG. 6) for the highest decomposition level of the analysis filter processing (i.e., decomposition level 2 in the example of FIG. 6). The fifth column from the right end represents low-frequency-component outputs of the synthesis filter processing and the fourth column from the right end represents high-frequency-component outputs of the synthesis filter processing.

The third column from the right end to the rightmost column represent a result of the synthesis filter processing (vertical filter processing) for decomposition level 1. The squares in the third column from the right end represent outputs (high-frequency component outputs and low-frequency component outputs) of the synthesis filter processing for decomposition level 2. That is, the result of the synthesis filter processing at a certain decomposition level is used as low-frequency-component inputs for the synthesis filter processing at the next decomposition level. The circles in the third column from the right end represent coefficient data to be subjected to inverse wavelet transform. This coefficient data corresponds to the high-frequency-component outputs (the second column from the left end in the example of FIG. 6) for the decomposition level (decomposition level 1 in the example of FIG. 6) higher by one level in the analysis filter processing. The second column from the right end represents low-frequency-component outputs of the synthesis filter processing and the rightmost column represents high-frequency-component outputs of the synthesis filter processing.

That is, the analysis filter processing is recursively repeated on the generated low-frequency component outputs and the high-frequency component outputs as low-frequency components.

In this case, the order of output of the coefficient data of the analysis filter processing and the order of use of the coefficient data of the synthesis filter processing are different from each other, as illustrated in FIG. 6. The analysis filter generates coefficient data earlier for the components of higher frequencies (i.e., n order of high-frequency components to low-frequency components). The synthesis filter uses the coefficient data earlier for the components of the lower frequencies (i.e., in order of low-frequency components to high-frequency components).

In the leftmost column to the sixth column from the left end in FIG. 6, C1 to C9 represent the order of output of the coefficient data. In the sixth column from the right end to the rightmost column in FIG. 6, C1 to C9 represent the order in which the pieces of coefficient data are used for the synthesis filter processing and numbers in parentheses ( ) represent analysis-filter-processing outputs corresponding to the pieces of coefficient data.

For example, the coefficient data C1(5) and C2(4) in the sixth column from the right end are subjected to the synthesis filter processing (the vertical filter processing for decomposition level 2), so that coefficient data Cf in the fifth column from the right end is generated. The coefficient data C1(5) corresponds to the coefficient data C5 in the sixth column from the left end and the coefficient data C2(4) corresponds to the coefficient data C4 in the fifth column from the left end.

Next, the coefficient data Cf and the coefficient data C3(1) in the third column from the right end are subjected to the synthesis filter processing (the vertical filter processing for decomposition level 1), so that the decoded image data for the odd-numbered lines is generated. The coefficient data C3(1) corresponds to the coefficient data C1 in the second column from the left end.

That is, in a first round of the processing, the analysis filter outputs the coefficient data in the following order.

Order of Coefficient Output by Analysis Filter:
    C1→C2→C3→C4→C5

In turn, in the first round of the processing, the synthesis filter uses the coefficient data in the following order.

Order of Coefficient Data Used by Synthesis Filter:
    C5→C4→C1

In a second round of the processing, the analysis filter outputs the coefficient data in the following order:

Order of Coefficient Data Output by Analysis Filter:
C6→C7→C8→C9

In turn, in the second round of the processing, the synthesis filter uses the coefficient data in the following order.

Order After Rearrangement: C9→C8→C2→C3

As described above, the order of generation of the coefficient data of the components and the order of use thereof are different from each other. Thus, in order to suppress a delay-time increase due to analysis filter processing and synthesis filter processing as described above, the coefficient rearranging unit 125 rearranges the coefficient data stored in the coefficient rearrangement buffer 124 in order of high-frequency components to low-frequency components, by reading the coefficient data in order of the coefficient data used by the synthesis filter processing, i.e., in order of low-frequency components to high-frequency components.

With this arrangement, the coefficient data is encoded in order of low-frequency components to high-frequency components and the encoded coefficient data is transmitted. That is, the coefficient data is supplied to the transmission destination in order of low-frequency components to high-frequency components. Thus, the transmission destination (the decoding side) can perform synthesis filter processing with lower delay, without rearranging the coefficient data.

In order to perform the analysis filter processing with lower delay, the line-based wavelet transform unit 123 performs analysis filter processing on image data for each data unit that is smaller than a picture, rather than performing analysis filter processing on the image data for each picture. That is, the line-based wavelet transform unit 123 performs analysis filter processing for each of line blocks obtained by dividing a picture along a pixel line.

The term "line block" as used herein corresponds to a picture partial region constituted by one pixel line or multiple pixel lines. More specifically, the line block corresponds to image data for a number of lines used by the wavelet transform to generate data for one line (i.e., coefficient data for one line of a subband of lowest-frequency components).

That is, image data corresponding to a number of lines used to generate data for one line of the lowest-frequency components (i.e., coefficient data for one line of a subband of the lowest-frequency components) is referred to as a line block (or a precinct). The line-based wavelet transform unit 123 performs the analysis filter processing for each line block.

The line block or the precinct may also be applied to a filter processing result. That is, the line block (or precinct) refers to, in the original image data before the wavelet transform, a pixel data group for a number of lines used for generating coefficient data for one line of a subband of the lowest-frequency components after the wavelet transform, or refers to a coefficient data group of each subband which is obtained by performing the wavelet transform on the pixel data group.

In the case of an example in FIG. 6, the first round of the wavelet transform processing is performed using the pixel data of seven lines. That is, the line-based wavelet transform unit 123 can start the wavelet transform processing when coefficient data for seven lines is stored in the intermediate-calculation buffer 122. In the example illustrated in FIG. 6, since the lifting computation is used, the analysis filter processing can be started in practice when coefficient data for three lines is stored.

In the second or subsequent round of the wavelet transform processing, since the previous wavelet transform processing results (including intermediate results) can be used, the analysis filter processing can be started when pixel data for four lines is input.

Thus, the line-based wavelet transform unit 123 performs the wavelet conversion for each line block to thereby make it possible to start the wavelet transform processing without waiting for coefficient data for all lines to be stored in the intermediate-calculation buffer 122. Thus, the coefficient rearranging unit 125, the quantizing unit 126, and the entropy encoding unit 127 can start the respective processing earlier. That is, the line-based wavelet transform unit 123 can perform the wavelet transform processing with lower delay.

Thus, the line-block encoder 101 can output the encoded data earlier. That is, the line-block encoder 101 can encode the image data with lower delay.

As illustrated in FIG. 6, the inverse-wavelet-transform processing is also performed for each line block so as to correspond to such wavelet transform processing. Thus, the inverse wavelet transform (decoding processing) can also be performed with lower delay.

Figure 7A:
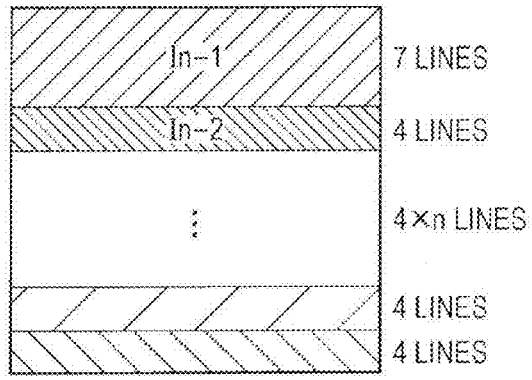
FIGS. 7A to 7C schematically illustrate a flow of wavelet transform and inverse wavelet transform.
Figure 7B:
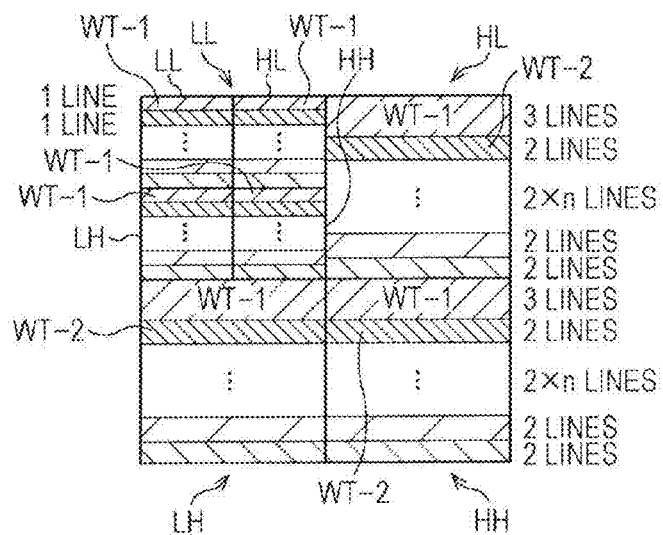
Figure 7C:
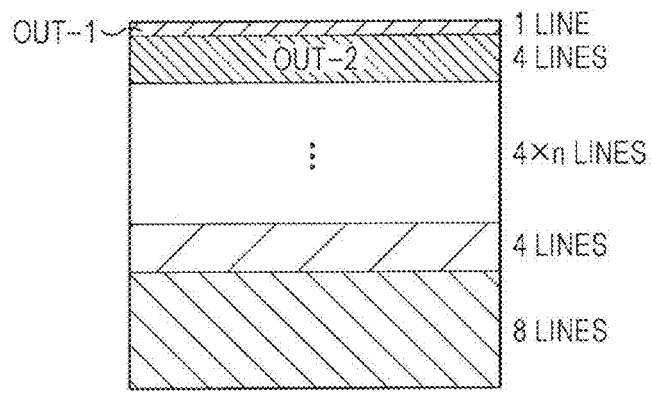

FIGS. 7A to 7C illustrate a state in which the operation illustrated in FIG. 6 is executed on an entire image while the wavelet transform is performed from the top to the bottom of the screen. FIG. 7A illustrates an input image. As illustrated, the first input In-1 is a 7-line input and the input In-2 and the subsequent inputs are 4-line inputs. FIG. 7B illustrates a wavelet transform result (analysis). As illustrated, in first WT-1, one line generated at level 1 and three lines are generated at level 2, and in WT-2, one line is generated at level 1 and two lines are generated at level 2.

FIG. 7C illustrates an output image at the synthesis filter at the decoding side. As illustrated, as a result of performing inverse wavelet transform on WT-1, one line Out-1 is obtained, four lines are generated from WT-2, and eight lines are generated as the last lines.

As illustrated in FIG. 8, the elements in image encoding and decoding processing as described above can be executed in parallel, so that the processing can be accomplished with lower delay.

Now, calculation of a delay time from the input of an image until the output of the image when wavelet transform is performed up to decomposition level 2 by using the 5×3 filter is discussed with reference to FIGS. 7A to 7C. The delay time from when image data for the first line is input until the image data for the first line is subjected to encoding processing, transmitted, subjected to decoding processing, and output is given by the total of factors described below. In this case, the delay time does not involve a delay that varies depending on the system configuration. Examples of such a delay include a delay in a transmission path and a delay due to actual processing timing of each unit of the apparatus.

(1) A delay D_WT from when image data for the first line is input until the wavelet transform WT-1 for seven lines is completed (2) Time D_Ord involved in rearrangement Ord-1 of coefficients for three lines (3) Time D_EC for entropy encoding EC-1 for the three lines (4) Time D_iEC for entropy decoding iEC-1 for the three lines (5) Time D_iWT for inverse wavelet transform iWT-1 for the three lines With reference to FIGS. 7A to 7C, an attempt is made to calculate a delay with the above-described factors. The delay D_WT in (1) corresponds to an amount of time for 10 lines. When one line is processed after start of the rearrangement Ord-1, the entropy encoding EC-1 can be started. In addition, when two lines are processed after start of the entropy decoding iEC-1, the inverse wavelet transform iWT-1 can be started. The entropy decoding iEC-1 can also be started when the encoding for one line is completed in the entropy encoding EC-1.

Thus, in the example in FIG. 7, the delay time from when the image data for the first line is input until encoding processing, the decoding processing, and so on are performed and then the image data for the first line is output is equivalent to 17 lines (=10+1+1+2+3).

The delay time will now be discussed in conjunction with a more specific example. When HDTV (high definition television) interlace video signals are input as the image data, one frame is realized with a resolution of, for example, 1920 pixels×1080 lines and one field is constituted by 1920 pixels× 540 lines. Thus, when the frame frequency is assumed to be 30 Hz, 540 lines in one field are input in the period of 16.67 msec (=1 sec/60 fields).

As a result, the delay time taken for the input of the image data for seven lines is 0.216 msec (=16.67 msec×7/540 lines), which is a significantly shorter time than, for example, an update time of one field. In addition, since the number of lines to be processed with respect to the total of the delay times of (1) to (5) described above, the delay time is significantly reduced. When the elements that perform the above-described processing are implemented by hardware, the processing time can further be reduced.

The description of the line-block encoder 101 at the front stage of the configuration illustrated in FIG. 1 has been given thus far. The code stream output from the entropy encoding unit 127 in the line-block encoder 101 is sent to the MXF-file generator 102 for each line, as described above.

[MXP File Generator]

The MXF-file generator 102 converts encoded data (a code stream), supplied from the line-block encoder 101, into an MXF file for each line block. Thus, rather than converting the encoded data (the code stream) into an MXF file for each picture or sequence as in the related art, the MXF-file generator 102 converts the decoded file into an MXF file for each line block. By doing so, the MXF-file generator 102 can convert the decoded data into an MXF file with lower delay. With this arrangement, the MXF-file generator 102 can reduce the amount of memory for accumulating the supplied encoded data (the code stream), to thereby make it possible to suppress an increase in cost.

As illustrated in FIG. 1, the MXF-file generator 102 includes a header-partition generating unit 131, a body-partition generating unit 132, a footer-partition generating unit 133, and a partition merging unit 134.

The header-partition generating unit 131 generates a header partition for an MXF file. The header-partition generating unit 131 supplies the generated header partition to the partition merging unit 134.

The body-partition generating unit 132 generates a body partition for the MXF file. The body-partition generating unit 132 supplies the generated body partition to the partition merging unit 134.

The footer-partition generating unit 133 generates a footer partition for the MXF file. The footer-partition generating unit 133 supplies the generated footer partition to the partition merging unit 134.

The partition merging unit 134 merges the header partition supplied from the header-partition generating unit 131, the body partition supplied from the body-partition generating unit 132, and the footer partition supplied from the footer-partition generating unit 133 to generate the MXF file. The partition merging unit 134 outputs the generated MXF file to outside of the image encoding apparatus 100 and the MXF file is transmitted to the transmission destination.

[MXF]

Figure 9:
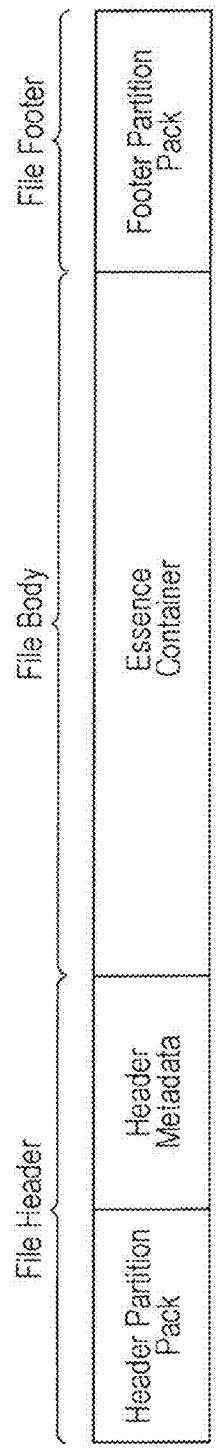
FIG. 9 illustrates an example of a basic structure of a logical format of an MXF.

Now, the MXF will be described. FIG. 9 illustrates a basic logical structure of an MXF format disclosed in SMPTE 377M: The MXF File Format Specification (the overall master document). The MXF file has a logical structure in which the first portion thereof is a file header, the center portion is a file body, and the end portion is a file footer. The file header can contain metadata, which is a feature of the MXF. The file body can contain content, such as video and audio content.

Figure 10:
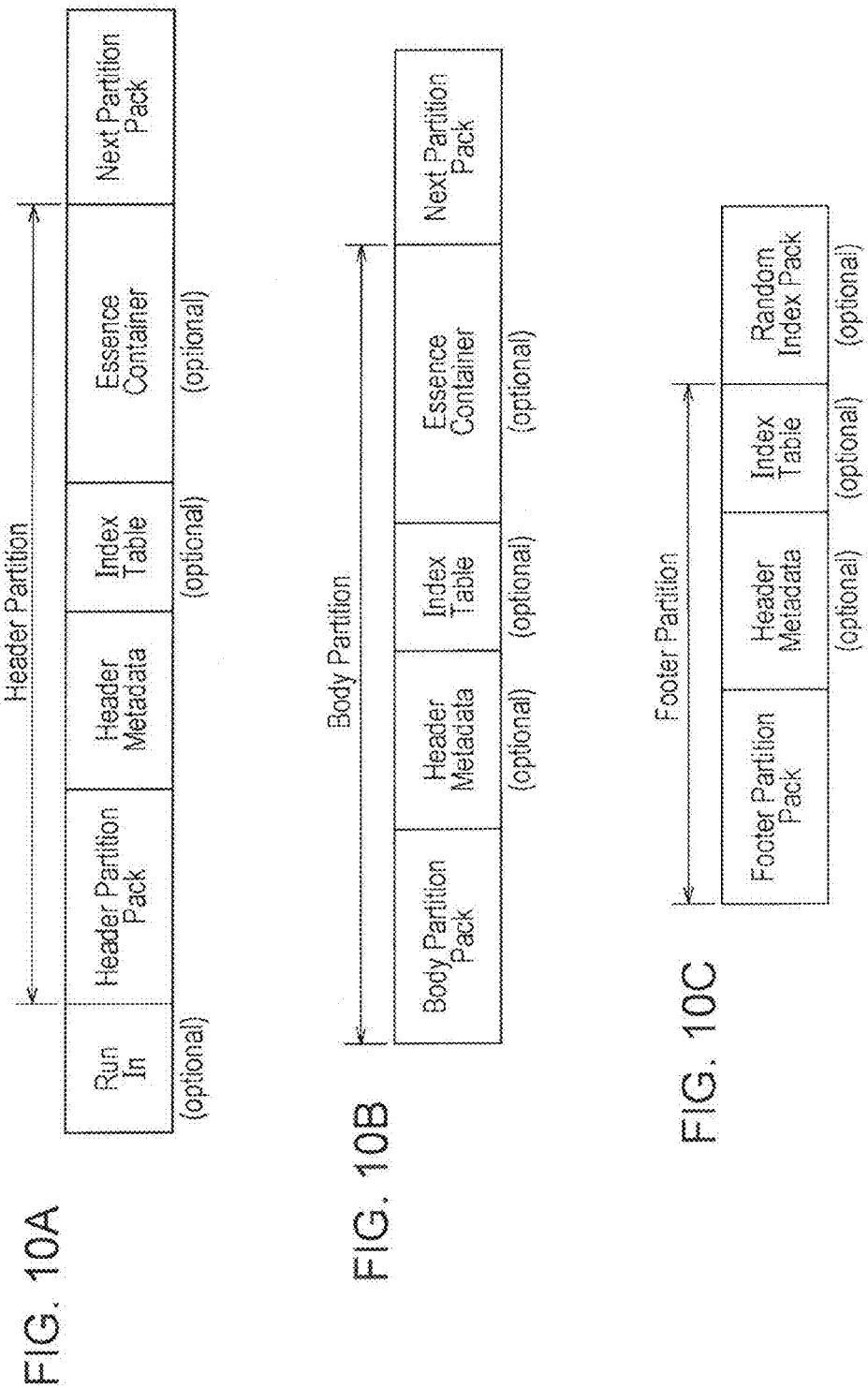
FIGS. 10A to 10C illustrate an example of a physical structure of a logical format of the MXF.

In addition to a logical structure as described above, the MXF file is segmented by physical structures called "partitions" as illustrated in FIGS. 10A to 10C. A region segmented by the partition is referred to as a "partition pack".

A header partition illustrated in FIG. 10A is a partition that contains a file header and so. More specifically, the header partition has a header partition pack and header metadata. The header partition may optionally contain an index table segment and an essence container.

A body partition illustrated in FIG. 10B is a partition that contains a file body and so. More specifically, the body partition has a body partition pack. The body partition may optionally contain header metadata, an index table segment, and an essence container.

A footer partition illustrated in FIG. 10C is a partition that contains a file footer and so. More specifically, the footer partition has a footer partition pack. The footer partition may optionally contain header metadata and an index table segment.

Figure 11:
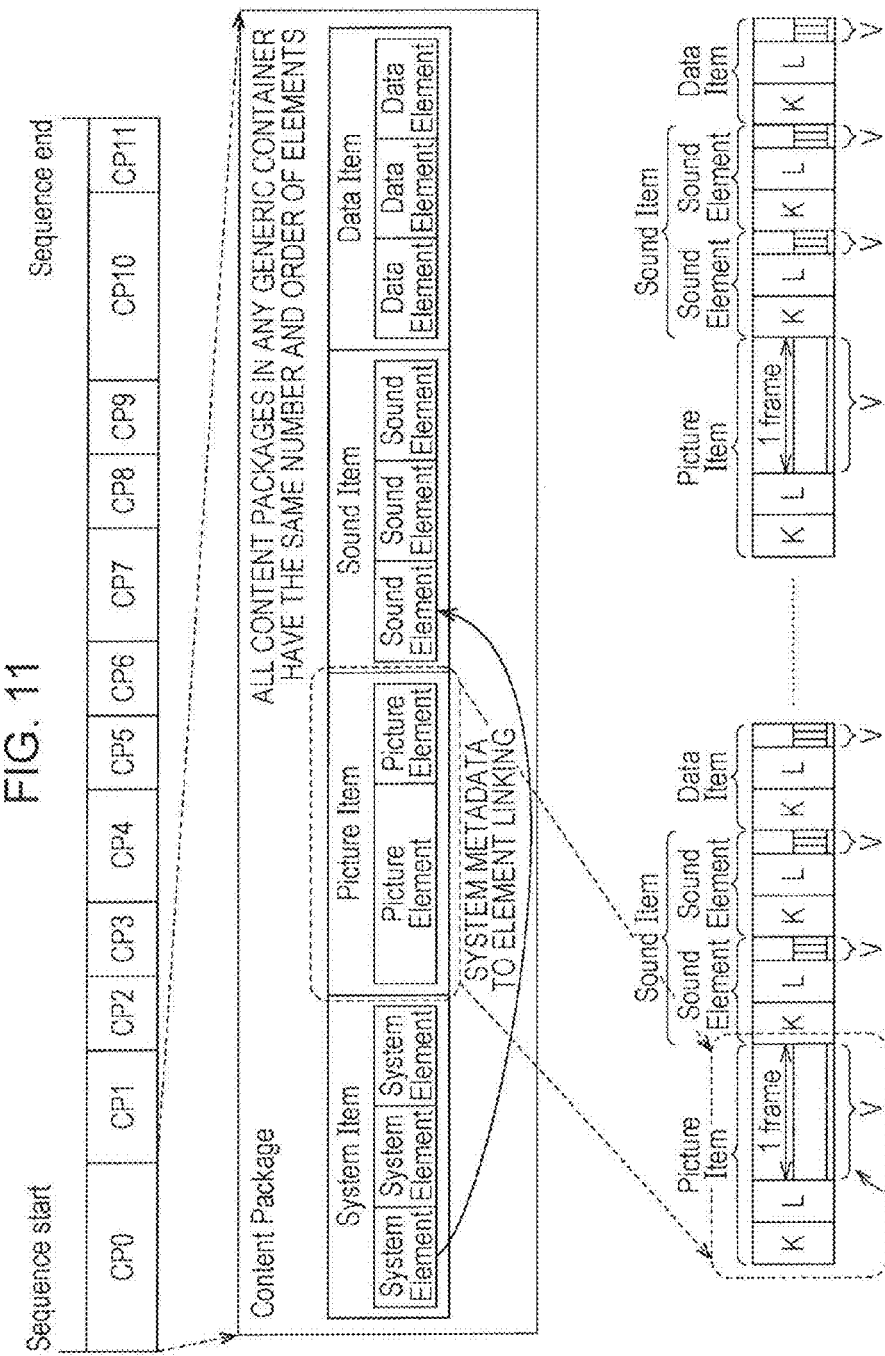
FIG. 11 illustrates an example of the configuration of essence container data.

The aforementioned essence container data is defined in SMPTE 379M: Generic Container (the way that essence is stored in MXF files). An upper section in FIG. 11 illustrates a basic structure of the essence container. As illustrated in FIG. 11, the essence container data may have multiple CPs (content packages). However, the essence container has only CP0, since the MXF-file generator 102 converts the encoded data into an MXF file for each line block and allocates one picture item to one line block.

The middle section in FIG. 11 illustrates items and elements in the CP. A picture item contained in the CP has a KLV (key-length-value) structure as illustrated at the lower section in FIG. 11. Actual image data is recorded to V (value). The data length of V is recorded to L (length). K (key) is identification information (tag) for identifying the data.

The header-partition generating unit 131 illustrated in FIG. 1 generates a header partition as illustrated in FIG. 10A. The body-partition generating unit 132 generates body partitions as illustrated in FIG. 10B. The footer-partition generating unit 133 generates a footer partition as illustrated in FIG. 10C.

[Body-Partition Generating Unit]

As illustrated in FIG. 1, the body-partition generating unit 132 includes a code-stream data-length detecting unit 141, an essence-container-data generating unit 142, an index-table-segment generating unit 143, and a header-metadata generating unit 144.

The code-stream data-length detecting unit 141 measures the data length of a code stream for each line block (e.g., actual data length, such as 100 bytes or 800 bits) and supplies the code stream for the line block to the essence-container-data generating unit 142 in conjunction with the data length.

The essence-container-data generating unit 142 uses the supplied code stream for the line-block and the data length to generate essence container data. More specifically, the essence-container-data generating unit 142 records the supplied code stream for each line block to the region V in the picture item and records the data length of the code stream to L. The essence-container-data generating unit 142 also records information, defined by SMPTE (Society of Motion Picture and Television Engineers), to K. The essence-container-data generating unit 142 supplies the generated essence container data to the index-table-segment generating unit 143.

By using information of the essence container data supplied from the essence-container-data generating unit 142, the index-table-segment generating unit 143 generates an index table segment. When multiple pieces of essence container data are contained in the MXF file, the index table segment is a group of data used to describe respective pieces of position information (indexing) thereof. The index-table-segment generating unit 143 supplies the generated index table segment to the header-metadata generating unit 144 in conjunction with the essence container data.

Figure 12:
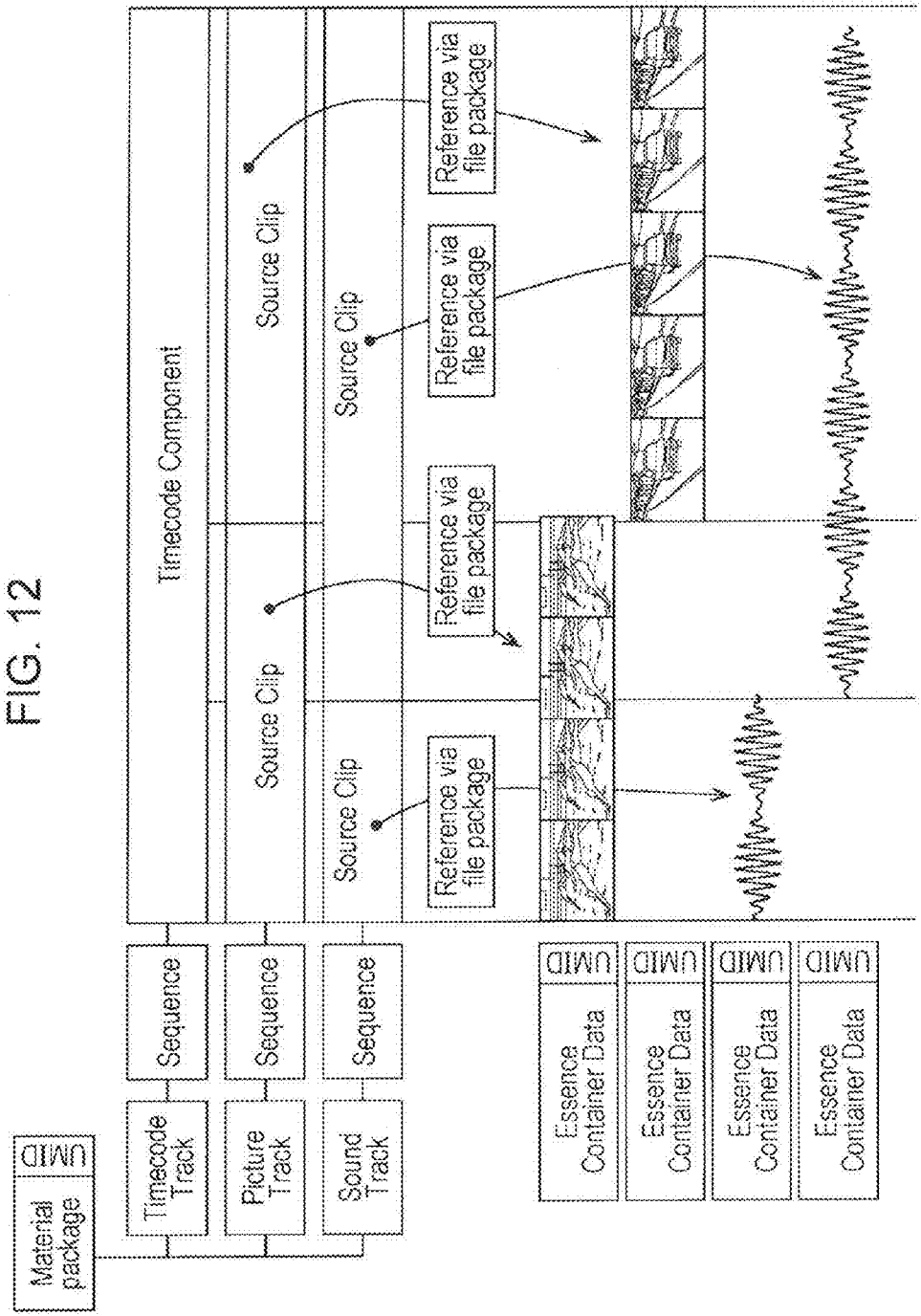
FIG. 12 illustrates an example of a relationship between header metadata and essence container data.

By using the information of the essence container data, the header-metadata generating unit 144 generates header metadata. FIG. 12 illustrates an example of a relationship between the header metadata and the essence container data. This relationship is defined in SMPTE 377M: The MXF File Format Specification (the overall master document). As illustrated in FIG. 12, in the header metadata, the essence container data, which is a contiguous sequence of images, is associated to indicate at what time (timecode) the essence container data exists in a picture track in the MXF file. For example, information regarding time-series association of image and audio metadata as illustrated in FIG. 12 is written in the header metadata.

The header-metadata generating unit 144 supplies the generated header metadata to the partition merging unit 134 in conjunction with the index table segment and the essence container data.

Since the header metadata and the index table segment are optional, generation thereof can be omitted. The index table segment and the essence container data output by the index-table-segment generating unit 143 may also be supplied to the footer-partition generating unit 133 so as to be used for generation of the footer partition.

[Low-Delay Data Structure of Partition]

During MXF-file generation as described above, the header-partition generating unit 131, the body-partition generating unit 132, and the footer-partition generating unit 133 convert the data structures of the partitions into low-delay data structures so that the MXF file can be transmitted with lower delay.

Figure 13A:
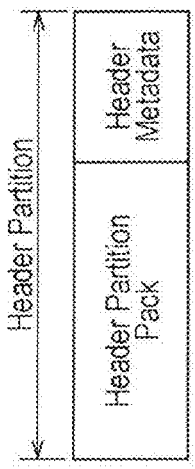
FIGS. 13A to 13C illustrate an example of low-delay structures of physical formats of partitions.
Figure 13B:
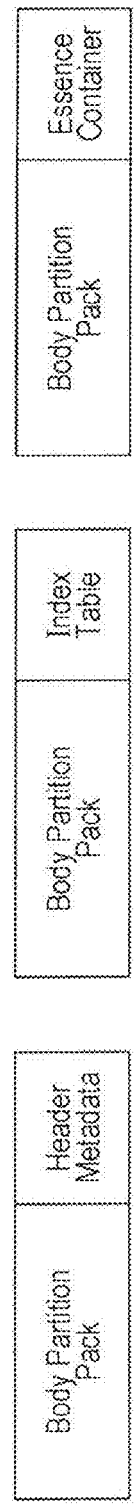
Figure 13C:
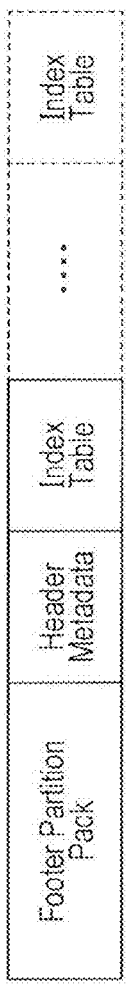

FIGS. 13A to 13C illustrate an example of the low-delay data structures of the partitions. The header-partition generating unit 131 generates a header partition having a data structure as illustrated in FIG. 13A. That is, since the elements other than the basic elements may be omitted, the header-partition generating unit 131 generates a header partition having elements constituted by a header partition pack and header metadata (i.e., does not contain the options).

The body-partition generating unit 132 generates body partitions having a data structure as illustrated in FIG. 13B. That is, the body-partition generating unit 132 generates a body partition having elements constituted by a body partition pack, which is flag information located at the front of the body partition, and header metadata; a body partition having elements constituted by a body partition pack and an index table segment; and a body partition having elements constituted by a body partition pack and essence container data.

As described above, after the code stream of one line block is written to the essence container data, the index table segment is generated based on the information of the essence container data and the header metadata is generated. Thus, in order to suppress a delay-time increase due to generation of the body partitions, the body-partition generating unit 132 generates the body partitions in accordance with that order.

That is, the body-partition generating unit 132 first generates a first body partition having elements constituted by the body partition pack and the essence container, generates a second body partition having elements constituted by the body partition pack and the index table segment, and then generates a third partition having elements constituted by the body partition pack and the header metadata. That is, a group of body partitions that are arranged in that order is generated.

The footer-partition generating unit 133 generates a footer partition having a data structure as illustrated in FIG. 13C. That is, the footer-partition generating unit 133 generates a footer partition having elements constituted by a footer partition pack, header metadata, and one or more index table segments.

Thus, by generating an MXF file so that no redundant element is contained in each partition so as to minimize the number of elements in each partition (i.e., by generating an MXF file having a low-delay data structure), the MXF-file generator 102 further facilitates exchange of the MXF file and allows data transmission of the MXF file to be performed with lower delay.

As described above, the MXF-file generator 102 can generate an MXF file by using a method suitable for the encoded data generated with low delay. Thus, the image encoding apparatus 100 can achieve a higher degree of freedom and a lower delay with respect to transmission of data, such as image and audio data.

[Flow of Encoding Processing]

Next, a description will be given of flows of the respective processes executed by the image encoding apparatus 100 as described above. First, an example of the flow of encoding processing executed by the image encoding apparatus 100 will be described with reference to a flowchart illustrated in FIG. 14.

Figure 14:
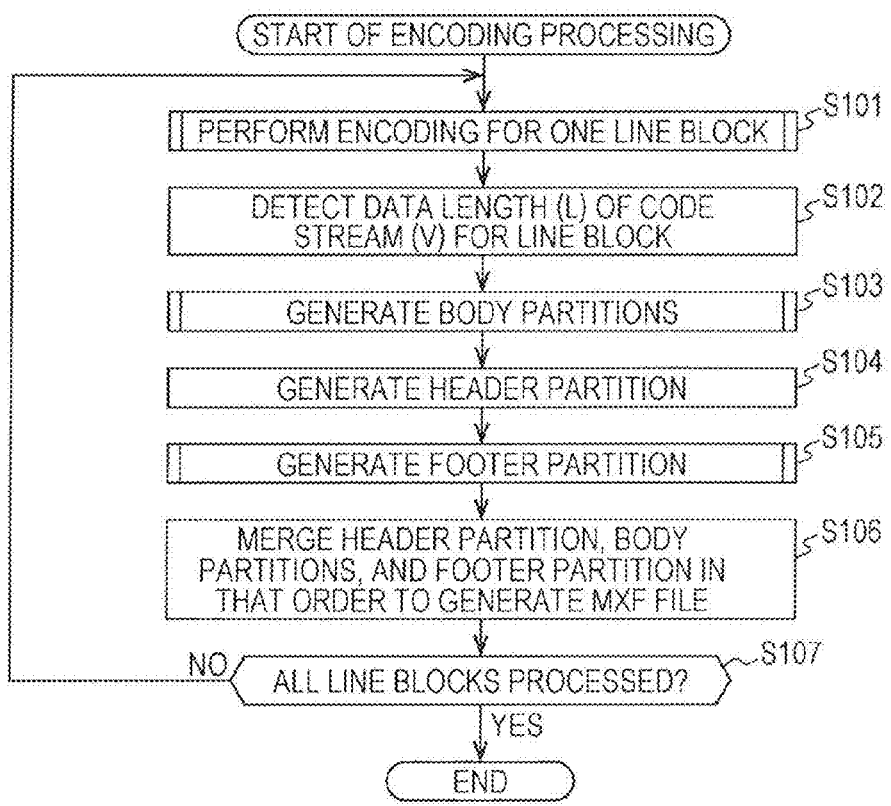
FIG. 14 is a flowchart illustrating an example of a flow of encoding processing.

The image encoding apparatus 100 executes encoding processing, illustrated in FIG. 14, for each picture of input image data.

Upon start of the encoding processing, the line-block encoder 101 encodes the input image data for one line block in step S101.

In step S102, the code-stream data-length detecting unit 141 detects the data length (L) of the code stream (V) for one line block, the code stream (V) being generated in step S101.

In step S103, the body-partition generating unit 132 generates body partitions having a low-delay data structure, for example, as illustrated in FIG. 13B.

In step S104, the header-partition generating unit 131 generates a header partition having a low-delay data structure, for example, as illustrated in FIG. 13A.

In step S105, the footer-partition generating unit 133 generates a footer partition having a low-delay data structure, for example, as illustrated in FIG. 13C.

In step S106, the partition merging unit 134 merges the header partition, generated in the process in step S104, the body partitions, generated in the process in step S103, and the footer partition, generated in the process in step S105, in that order to generate an MXF file containing a code stream for one line block. The partition merging unit 134 outputs the generated MXF file to outside of the image encoding apparatus 100.

The MXF file is transmitted to, for example, another apparatus (e.g., an image decoding apparatus corresponding to the image encoding apparatus 100) via an arbitrary transmission medium, such as a wired or wireless network or an arbitrary recording medium, such as a hard disk.

In step S107, the partition merging unit 134 determines whether or not all line blocks for the picture to be processed (the picture of interest) have been processed. Upon determining that an unprocessed line bock exists, the process returns to step S101 and the subsequent processes are repeated.

The processes in steps S101 to S107 are executed on each line block. When it is determined in step S107 that all lines blocks for the picture of interest have been processed, the partition merging unit 134 ends the encoding processing.

[Flow of Line-Block Encoding Processing]

Figure 15:
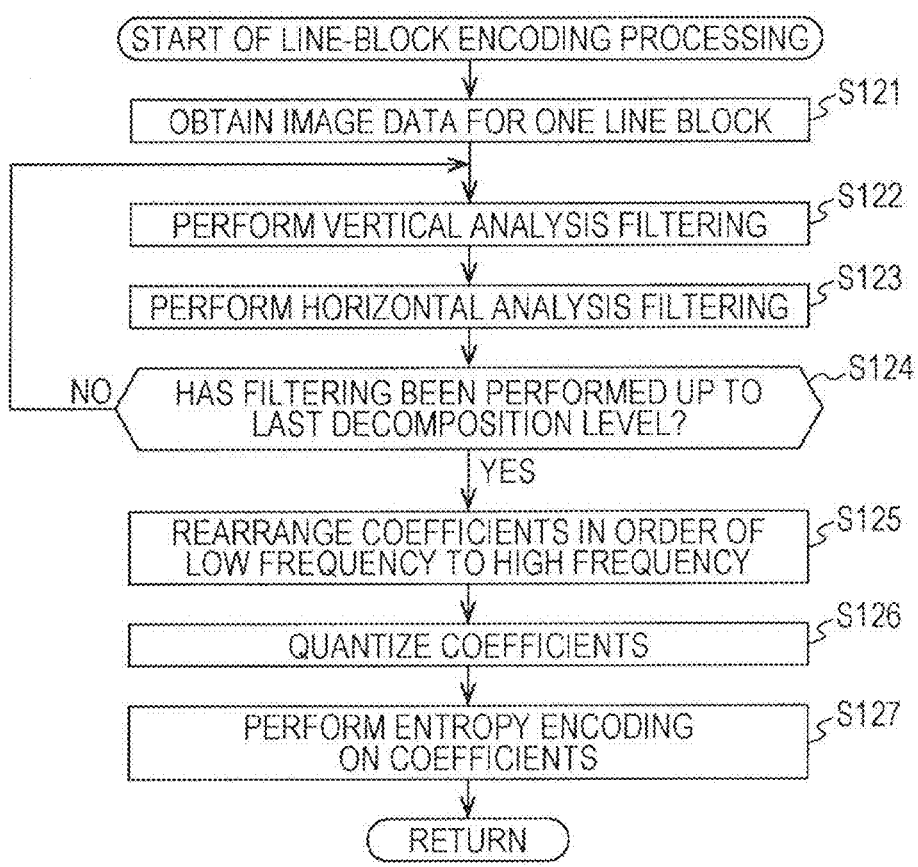
FIG. 15 is a flowchart illustrating an example of a flow of line-block encoding processing.

Next, an example of the flow of the line-block encoding processing executed in step S101 in FIG. 14 will be described with reference to a flowchart illustrated in FIG. 15.

Upon start of the line-block encoding processing, the image-line input unit 121 obtains image data for one line block in step S121 and accumulates the image data in the intermediate-calculation buffer 122.

When the image data for one line block is accumulated, the process proceeds to step S122 in which the line-based wavelet transform unit 123 performs vertical analysis filtering, which is analysis filter processing in the vertical direction, on the image data for one line block. As described above, when the vertical analysis filtering is performed using lifting computation, the line-based wavelet transform unit 123 can start the vertical analysis filtering when the image data for three lines is accumulated. That is, before the image data for one line block is accumulated in the intermediate-calculation buffer 122, the line-based wavelet transform unit 123 can start the vertical analysis filtering.

Upon completion of the vertical analysis filtering, the process proceeds to step S123 in which the line-based wavelet transform unit 123 performs horizontal analysis filtering, which is analysis filter processing in the horizontal direction, on the result of the vertical analysis filtering. The image data resulting from the vertical analysis filtering is decomposed into vertical low-frequency components and vertical high-frequency components. The horizontal analysis filtering is performed on those components, so that they are decomposed into horizontal low-frequency components and horizontal high-frequency components. Thus, as a result of the processes in steps S122 and S123, four subbands are generated from the image data.

In step S124, the line-based wavelet transform unit 123 determines whether or not the analysis filtering has been performed up to a predetermined last decomposition level. When it is determined that the analysis filtering has not been performed up to the last decomposition level, the process returns to step S122 and the subsequent processes are repeated.

When the process returns to step S122, the line-based wavelet transform unit 123 increases the decomposition level by one level and executes the processes in steps S122 and S123 (the vertical analysis filtering and the horizontal analysis filtering) on coefficient data of the subband of both vertical- and horizontal-low-frequency components, the subband being included in four subbands generated by the previous analysis filtering. As a result, the subband of both vertical- and horizontal-low-frequency components is further decomposed into four subbands.

As described above, with respect to the subband of vertical and horizontal low-frequency components obtained by the analysis filtering, the line-based wavelet transform unit 123 recursively repeats the processes in steps S122 and S123 up to the last decomposition level.

When the line-based wavelet transform unit 123 determines in step S124 that the above-described analysis filtering has reached the last decomposition level, the process proceeds to step S125.

The line-based wavelet transform unit 123 stores, in the coefficient rearrangement buffer 124, the subband coefficient data output as a result of the processes in steps S122 and S123. That is, the line-based wavelet transform unit 123 stores the coefficient data in the coefficient rearrangement buffer 124 in order of high-frequency components to low-frequency components.

In step S125, the coefficient rearranging unit 125 reads the subband coefficient data, stored in the coefficient rearrangement buffer 124, in an order in which the pieces of coefficient data are used in the synthesis filtering, i.e., in order of low-frequency components to high-frequency components, to thereby rearrange the coefficient data.

In step S126, the quantizing unit 126 quantizes the coefficient data in order of the coefficient data rearranged in step S125.

In step S127, the entropy encoding unit 127 performs entropy encoding on the coefficient data quantized in step S126 and outputs the generated encoded data (the code stream).

Upon completion of the process in step S127, the entropy encoding unit 127 ends the line-block encoding processing and the process returns to FIG. 14.

[Flow of Body-Partition Generation Processing]

Next, an example of the flow of the body-partition generation processing executed in step S103 in FIG. 14 will be described with reference to a flowchart illustrated in FIG. 16.

Upon start of the body-partition generation processing, in step S141, the essence-container-data generating unit 142 generates KLV of essence container data by using the encoded data (the code stream) generated in the process in step S101 in FIG. 14 and generates, as a first body partition, a body partition containing the essence container data and having a low-delay data structure, as illustrated in FIG. 13B.

In step S142, the index-table-segment generating unit 143 generates an index table segment by using information of the essence container data generated in step S141. The index-table-segment generating unit 143 generates a body partition containing the generated index table segment and having a low-delay data structure, as illustrated in FIG. 13B. Thus, the index-table-segment generating unit 143 generates a body partition containing the index table segment as a second body partition subsequent to the first body partition generated in step S141. That is, the index-table-segment generating unit 143 adds the body partition containing the index table segment to the end of the body partition containing the essence container data.

In step S143, the header-metadata generating unit 144 generates header metadata by using the information of the essence container data generated in step S141 and information of the index table segment generated in step S142. The header-metadata generating unit 144 generates a body partition containing the generated header metadata and having a low-delay data structure, as illustrated in FIG. 13B. That is, the header-metadata generating unit 144 generates a body partition containing the header metadata as a third body partition subsequent to the second body partition generated in step S142. That is, the header-metadata generating unit 144 adds the body partition containing the header metadata to the end of the body partition containing the index table segment.

Upon generation of the three types of body partition as described above, the header-metadata generating unit 144 ends the body-partition generation processing and the process returns to FIG. 14.

[Flow of Footer-Partition Generation Processing]

Figure 17:
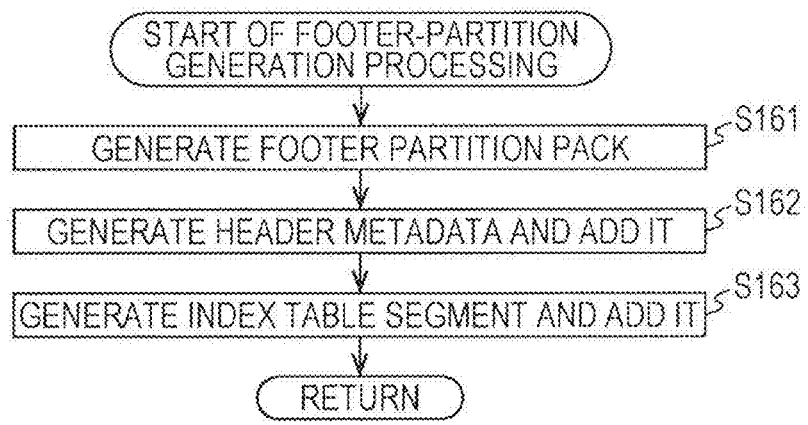
FIG. 17 is a flowchart illustrating an example of a flow of footer-partition generation processing.

Next, an example of the flow of the footer-partition generation processing executed in step S105 in FIG. 14 will be described with reference to a flowchart illustrated in FIG. 17.

Upon start of the footer-partition generation processing, the footer-partition generating unit 133 generates a footer partition pack in step S161.

In step S162, the footer-partition generating unit 133 generates header metadata and adds the header metadata to the end of the footer partition pack generated in step S161, as illustrated in FIG. 13C.

In step S163, the footer-partition generating unit 133 generates an index table segment and adds the index table segment to the end of the header metadata added to the footer partition pack in step S162, as illustrated in FIG. 13C.

Upon generation of the footer partition with the low-delay data structure as described above, the footer-partition generating unit 133 ends the footer-partition generation processing and the process returns to FIG. 14.

As a result of the processes as described above, the line-block encoder 101 can generate encoded data (a code stream) by encoding image data with low delay. The MXF-file generator 102 also can convert the encoded data (the code stream) into an MXF file without excessively increasing the delay time.

Accordingly, the image encoding apparatus 100 can achieve a higher degree of freedom and a lower delay with respect to transmission of data, such as image and audio data.

[Body Partition Omission]

Figure 18A:
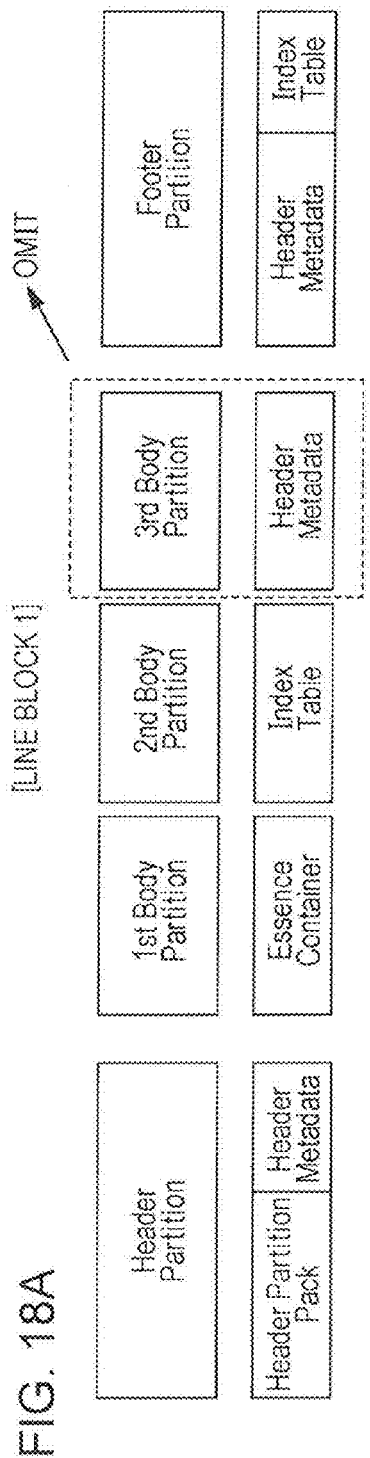
FIGS. 18A and 18B illustrate an example of the low-delay structure of the MXF.

FIG. 18A illustrates an example of the structure of an MXF file in which only a code stream for only one line block exists in the essence container data. As illustrated in this example, the header metadata of a third body partition and first header metadata of a subsequent footer partition are redundant.

Figure 18B:
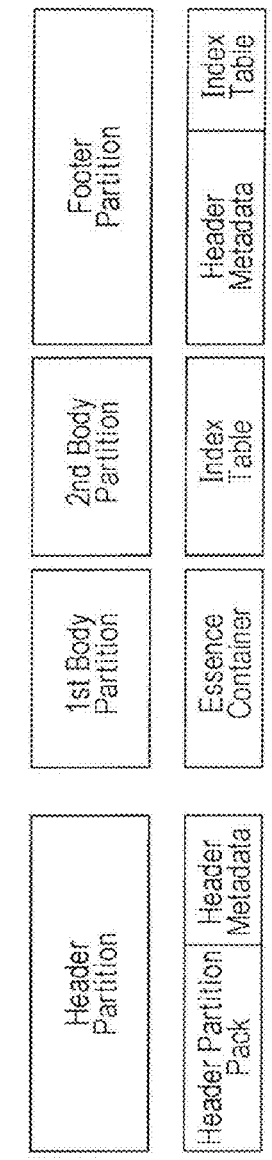

Thus, as illustrated in FIG. 18B, the third body partition (i.e., the body partition containing the header metadata) may be omitted (i.e., may not be added). In other words, the last body partition may be a second body partition (a body partition containing an index table). Instead, the information of the header metadata that is omitted (is not added) is contained in the header metadata contained in the footer partition.

As a result of the generation of the body partitions and the footer partition as described above, the MXF-file generator 102 can reduce the amount of information of the MXF file.

In this case, the image encoding apparatus 100 executes the encoding processing as in the case described above with reference to the flowchart illustrated in FIG. 14. The line-block encoder 101 also executes the line-block encoding processing as in the case described above with reference to the flowchart illustrated in FIG. 15. However, the body-partition generation processing and the footer-partition generation processing are executed as described below.

[Flow of Body-Partition Generation Processing]

An example of the flow of the body-partition generation processing in this case will now be described with reference to a flowchart illustrated in FIG. 19. This processing is processing that is executed in step S103 in FIG. 14 and that corresponds to the body-partition generation processing described above with reference to the flowchart in FIG. 16.

Figure 16:
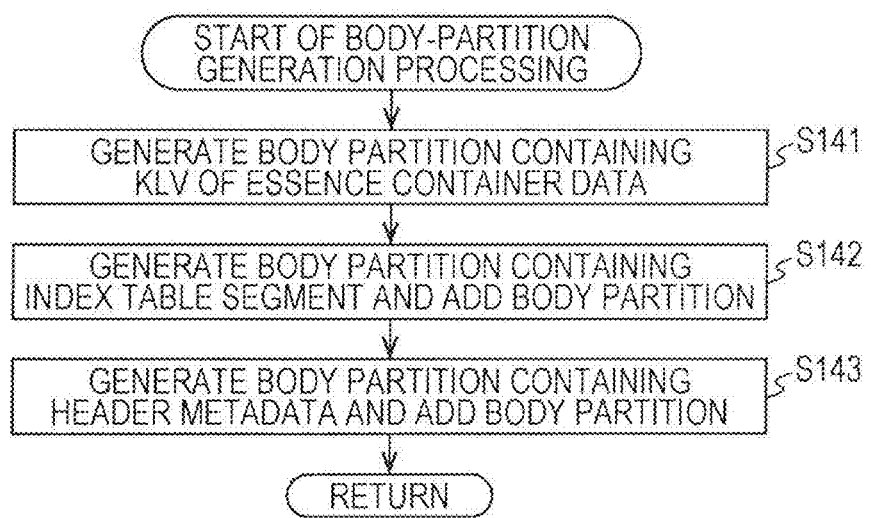
FIG. 16 is a flowchart illustrating an example of a flow of body-partition generation processing.

Upon start of the body-partition generation processing, processes in steps S181 and S182 are executed in the same manner as the processes in steps S141 and S142 in FIG. 16.

That is, a body partition (a first body partition) containing essence container data and having the low-delay data structure and a body partition (a second body partition) containing an index table segment and having the low-delay data structure are generated as in the case illustrated in FIG. 16.

In step S183, the header-metadata generating unit 144 generates header metadata by using information of the essence container data generated in step S181 and information of the index table segment generated in step S182. In this case, the header-metadata generating unit 144 ends the body-partition generation processing without generating a body partition containing header metadata and the process returns to FIG. 14.

That is, in this case, two types of body partition, i.e., the first body partition and the second body partition, are generated as in the example illustrated in FIG. 18B.

[Flow of Footer-Partition Generation Processing]

Figure 20:
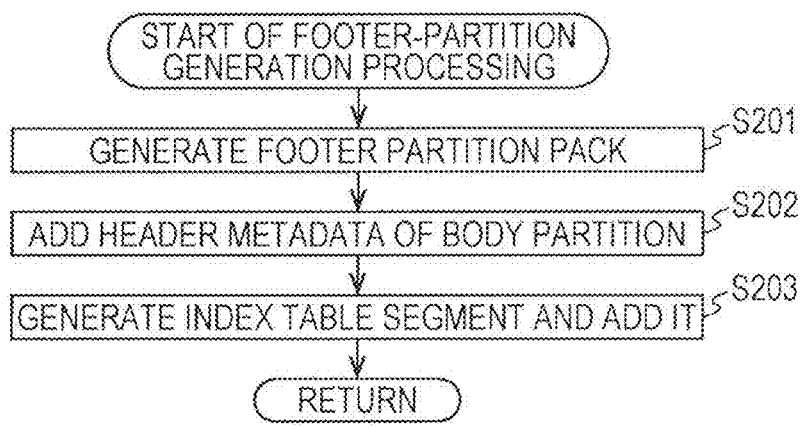
FIG. 20 is a flowchart illustrating another example of the flow of the footer-partition generation processing.

Next, an example of the flow of footer-partition generation processing in this case will be described with reference to a flowchart illustrated in FIG. 20. This processing is processing that is executed in step S105 in FIG. 14 and that corresponds to the footer-partition generation processing described above with reference to the flowchart in FIG. 17.

Upon start of the footer-partition generation processing, in step S201, the footer-partition generating unit 133 generates a footer partition pack as in the case in step S161.

Figure 19:
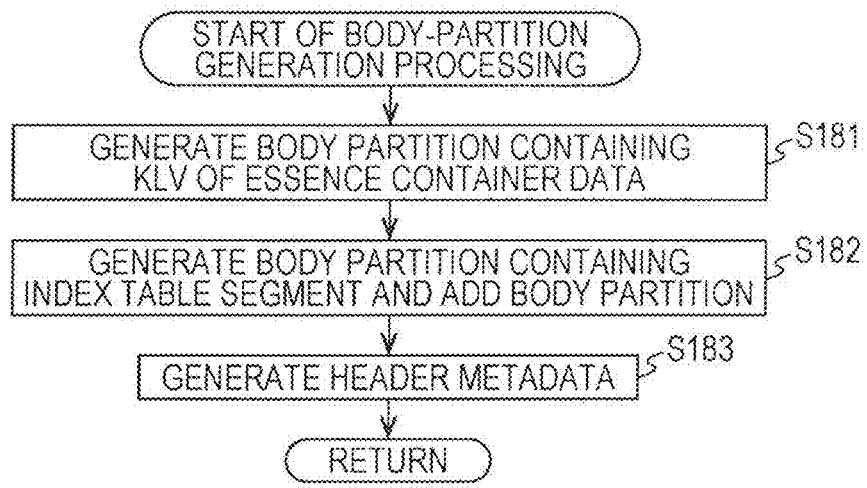
FIG. 19 is a flowchart illustrating another example of the flow of the body-partition generation processing.

In step S202, the footer-partition generating unit 133 adds the header metadata of the body partition, the header metadata being generated in step S183 in FIG. 19, to the end of the footer partition pack generated in step S201.

In step S203, the footer-partition generating unit 133 generates an index table segment and adds the index table segment to the end of the header metadata added to the footer partition pack in step S202.

That is, in this case, as in the example illustrated in FIG. 18B, the footer-partition generating unit 133 generates a footer partition (containing header metadata and an index table segment) having a structure that is similar to the structure illustrated in FIG. 13C. However, the header metadata contains the contents of the header metadata of the body partition.

Upon generation of the footer partition with the low-delay data structure as described above, the footer-partition generating unit 133 ends the footer-partition generation processing and the process returns to FIG. 14.

As a result of performing the processes as described above, the MXF-file generator 102 can reduce the amount of information of the MXF file, compared to the case described above with reference to FIGS. 14 to 17.

[Body Partition Omission 2]

Figure 21A:
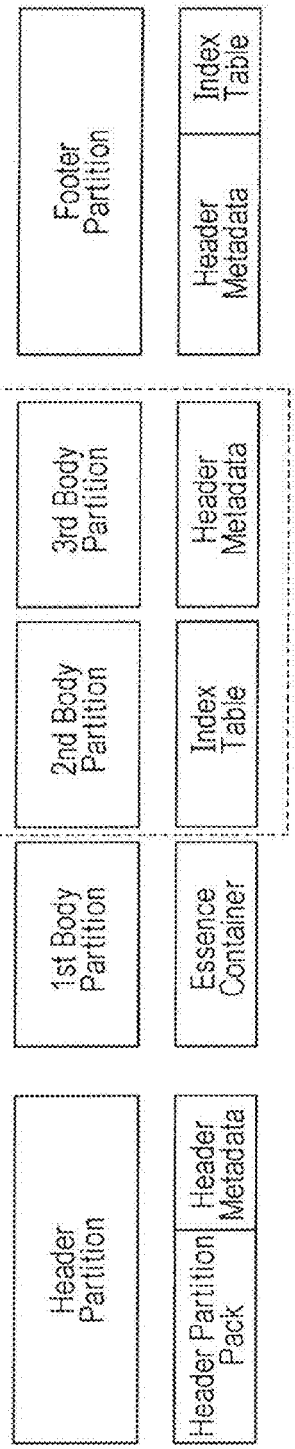
FIGS. 21A to 21B illustrate another example of the low-delay structure of the MXF.

FIG. 21A illustrates an example of the structure of an MXF file in which only a code stream for one line block exists in the essence container data. As illustrated in this example, the footer partition contains not only the header metadata but also the index table segment.

Figure 21B:
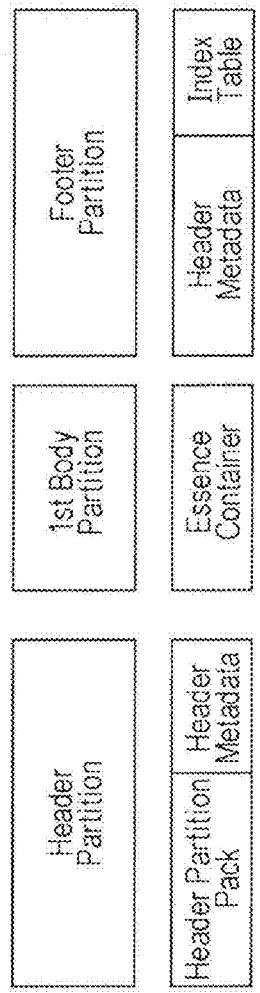

Thus, as illustrated in FIG. 21B, not only is the third body partition (i.e., the partition containing the header metadata) omitted, but also the second body partition (i.e., the body partition containing the index table segment) may be omitted (i.e., may not be added). That is, the body partition may be constituted by only the first body partition (i.e., the body partition containing the essence container data). Instead, the pieces of information of the header metadata and the index table segment that are omitted (are not added) are contained in the corresponding header metadata and the index table segment contained in the footer partition.

As a result of the generation of the body partition and the footer partition as described above, the MXF-file generator 102 can further reduce the amount of information of the MXF file.

In this case, the image encoding apparatus 100 executes the encoding processing as in the case described above with reference to the flowchart illustrated in FIG. 14. The line-block encoder 101 also executes the line-block encoding processing as in the case described above with reference to the flowchart illustrated in FIG. 15. However, the body-partition generation processing and the footer-partition generation processing are executed as described below.

[Flow of Body-Partition Generation Processing]

An example of the flow of the body-partition generation processing in this case will now be described with reference to a flowchart illustrated in FIG. 22. This processing is processing that is executed in step S103 in FIG. 14 and that corresponds to the body-partition generation processing described above with reference to the flowcharts in FIGS. 16 and 19.

Upon start of the body-partition generation processing, a process in step S221 is executed as in the process in step S141 in FIG. 16.

That is, a body partition (a first body partition) containing essence container data and having the low-delay data structure is generated as in the case illustrated in FIG. 16.

In step S222, the index-table-segment generating unit 143 generates an index table segment by using information of the essence container data generated in step S221. In this case, the index-table-segment generating unit 143 does not generate any body partition containing an index table segment, and the process proceeds to step S223.

In step S223, the header-metadata generator 144 generates header metadata by using the information of the essence container data generated in step S221 and the information of the index table segment generated in step S222. In this case, the header-metadata generating unit 144 ends the body-partition generation processing without generating any body partition containing header metadata and the process returns to FIG. 14, as in the case in step S183.

That is, in this case, only the first body partition is generated as the body partition, as in the example illustrated in FIG. 21E.

[Flow of Footer-Partition Generation Processing]

Figure 23:
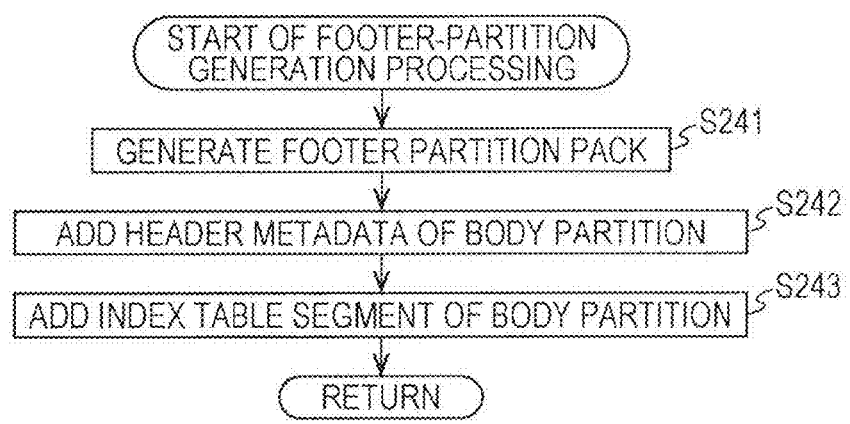
FIG. 23 is a flowchart illustrating yet another example of the flow of the footer-partition generation processing.

Next, an example of the flow of footer-partition generation processing in this case will be described with reference to a flowchart illustrated in FIG. 23. This processing is processing that is executed in step S105 in FIG. 14 and that corresponds to the footer-partition generation processing described above with reference to the flowcharts in FIGS. 17 and 20.

Upon start of the footer-partition generation processing, in step S241, the footer-partition generating unit 133 generates a footer partition pack as in the case in step S161.

Figure 22:
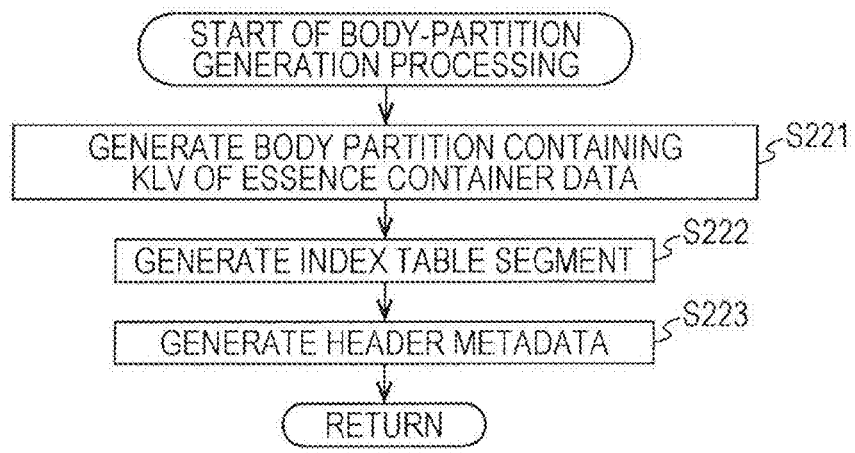
FIG. 22 is a flowchart illustrating yet another example of the flow of the body-partition generation processing.

In step S242, the footer-partition generating unit 133 adds the header metadata of the body partition, the header metadata being generated in step S223 in FIG. 22, to the end of the footer partition pack generated in step S241.

In step S243, the footer-partition generating unit 133 adds the index table segment of the body partition generated in step S222 in FIG. 22 to the end of the header metadata added to the footer partition pack in step S242.

That is, in this case, as in the example illustrated in FIG. 21B, the footer-partition generating unit 133 generates a footer partition (containing header metadata and an index table segment) having a structure that is similar to the structure illustrated in FIG. 13C. However, this header metadata contains the contents of the header metadata of the body partition and the index table segment contains the contents of the index table segment of the body partition.

Upon generation of the footer partition with the low-delay data structure as described above, the footer-partition generating unit 133 ends the footer-partition generation processing and the process returns to FIG. 14.

As a result of performing the processes as described above, the MXF-file generator 102 can further reduce the amount of information of the MXF file, compared to the case described above with reference to FIGS. 18A to 20.

[MXF File Containing Multiple Line Blocks]

Although the above description has been given of a case in which encoded data is converted into an MXF file for each line block, the present technology is not limited thereto and encoded data for multiple line blocks may also be wrapped into a single MXF file.

The delay time, however, is proportional to the number of line blocks. That is, for example, when encoded data for N line blocks is wrapped into one MXF file, the delay time thereof is N times the delay time taken when encoded data for one line block is wrapped into one MXF file.

When the delay time involved in the system is in a permissible range, encoded data for multiple line blocks may thus be wrapped into one MXF file, allowing for an increase in the delay time. For example, when a large amount of delay time is permitted or when a large amount of data can be transmitted at once because of a large band of a transmission path for transmission of MXF files, there are cases in which a margin for the delay time is large and thus encoded data for multiple line blocks can be wrapped into one MXF file.

Figure 24:
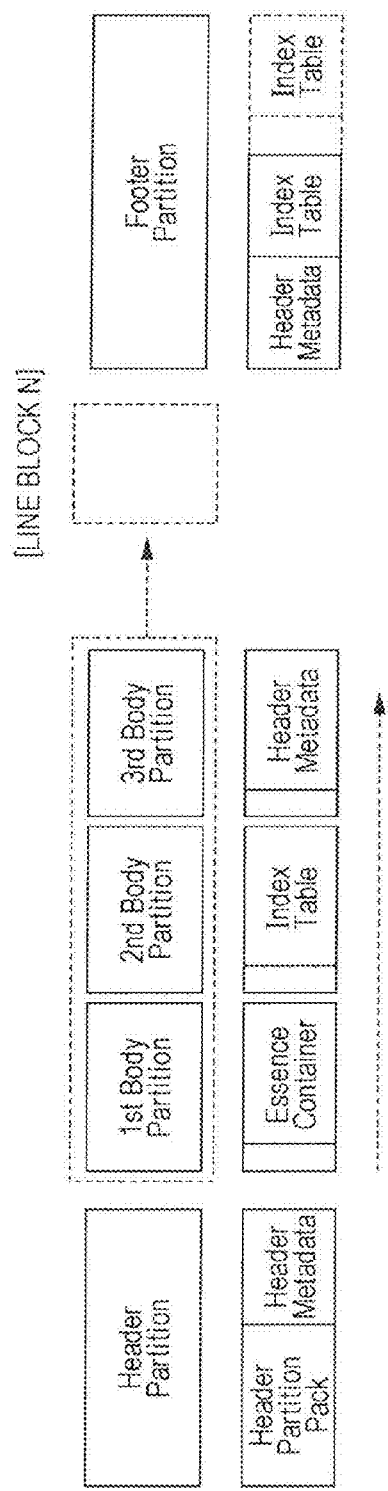
FIG. 24 illustrates yet another example of the low-delay structure of the MXF.

FIG. 24 illustrates an example of such a case in which encoded data for multiple line blocks is wrapped into one MXF file. As illustrated in FIG. 24, body partitions in this case are also generated for each line block. That is, first to third body partitions are generated for each line block and are added to the end of a body partition generated immediately before they were generated.

However, in this case, as illustrated in FIG. 24, the footer partition contains index table segments corresponding to the respective line blocks. That is, index table segments corresponding to the number of line blocks of the encoded data wrapped into the MXF file are added to the end of the header metadata of the footer partition.

[Flow of Encoding Processing]

An example of the flow of encoding processing when encoded data for multiple line blocks is wrapped into one MXF file will now be described with reference to a flowchart illustrated in FIG. 25. This processing corresponds to the encoding processing described above with reference to the flowchart illustrated in FIG. 14. Thus, the image encoding apparatus 100 executes the encoding processing, illustrated in FIG. 25, for each picture of input image data.

It is assumed in this case that encoded data for N line blocks (N is an integer greater than or equal to 2) is wrapped into one MXF file.

Upon start of the encoding processing, in step S301, the line-block encoder 101 performs line-block encoding processing as in the case in step S101 to thereby encode the input image data for one line block. That is, line-block encoding processing as in the case described above with reference to the flowchart in FIG. 15 is executed.

In step S302, as in the case in step S102, the code-stream data-length detecting unit 141 detects the data length (L) of the code stream (V) for one line block, the code stream (V) being generated in the process in step S301.

In step S303, the body-partition generating unit 132 executes body-partition generation processing as in the case in step S103 to generate body partitions having a low-delay data structure, for example, as illustrated in FIG. 13B. That is, body-partition generation processing as in the case described above with reference to the flowchart in FIG. 16 is executed.

In step S304, the partition merging unit 134 determines whether or not image data for N−1 line blocks has been processed. That is, when the number of line blocks of the processed image data is smaller than or equal to N−2, the process returns to step S301 in which the partition merging unit 134 repeats the subsequent processes.

The processes in steps S301 to S304 are repeatedly performed for each line block. When it is determined in step S304 that image data for N−1 line blocks has been processed, the process proceeds to step S305 in which the partition merging unit 134 starts processing for the last Nth line block.

In step S305, the line-block encoder 101 encodes the Nth line block as in the case in step S301. That is, line-block encoding processing as in the case described above with reference to the flowchart in FIG. 15 is executed.

In step S306, as in the case in step S302, with respect to the Nth line block, the code-stream data-length detecting unit 141 detects the data length (L) of the code stream (V) for the Nth line block, the code stream (V) being generated in the process in step S305.

In step S307, the body-partition generating unit 132 executes body-partition generation processing on the Nth line block as in the case in step S303 to generate body partitions having a low-delay data structure, for example, as illustrated in FIG. 13B. That is, body-partition generation processing as in the case described above with reference to the flowchart in FIG. 16 is executed.

Upon generation of the body partitions for N line blocks as described above, the process proceeds to step S308 in which the header-partition generating unit 131 generates a header partition having a low-delay data structure, for example, as illustrated in FIG. 13A, as in the case in step S104.

In step S309, the footer-partition generating unit 133 executes footer-partition generation processing to generate a footer partition having a low-delay data structure, for example, as illustrated in FIG. 24.

In step S310, the partition merging unit 134 merges the header partition, generated in the process in step S308, the body partitions, generated in the process in step S303, the body partitions, generated in the process in step S307, and the footer partition, generated in the process in step S309, in that order, as in the case in step S106, to thereby generate an MXF file containing a code stream for the N line blocks. The partition merging unit 134 outputs the generated MXF file to outside of the image encoding apparatus 100.

The MXF file is transmitted to, for example, another apparatus (e.g., an image decoding apparatus corresponding to the image encoding apparatus 100) via an arbitrary transmission medium, such as a wired or wireless network or an arbitrary recording medium, such as a hard disk.

In step S311, the partition merging unit 134 determines whether or not all line blocks for a picture to be processed (a picture of interest) have been processed. When it is determined that an unprocessed line bock exists, the process returns to step S301 and the subsequent processes are repeated.

The processes in steps S301 to S311 are executed on each line block, as appropriate. When it is determined in step S311 that all lines blocks for the picture of interest have been processed, the partition merging unit 134 ends the encoding processing.

[Flow of Footer-Partition Generation Processing]

Next, an example of the flow of the footer-partition generation processing executed in step S309 in FIG. 25 will be described with reference to a flowchart illustrated in FIG. 26.

Upon start of the footer-partition generation processing, in step S331, the footer-partition generating unit 133 generates a footer partition pack as in the case in step S161.

In step S332, as in the case in step S162, the footer-partition generating unit 133 generates header metadata and adds the header metadata to the end of the footer partition pack generated in step S331, as illustrated in FIG. 24.

In step S333, the footer-partition generating unit 133 generates index table segments for the respective N line blocks and adds the index table segments for the line blocks to the end of the header metadata added to the footer partition pack in step S332, as illustrated in FIG. 24.

Figure 25:
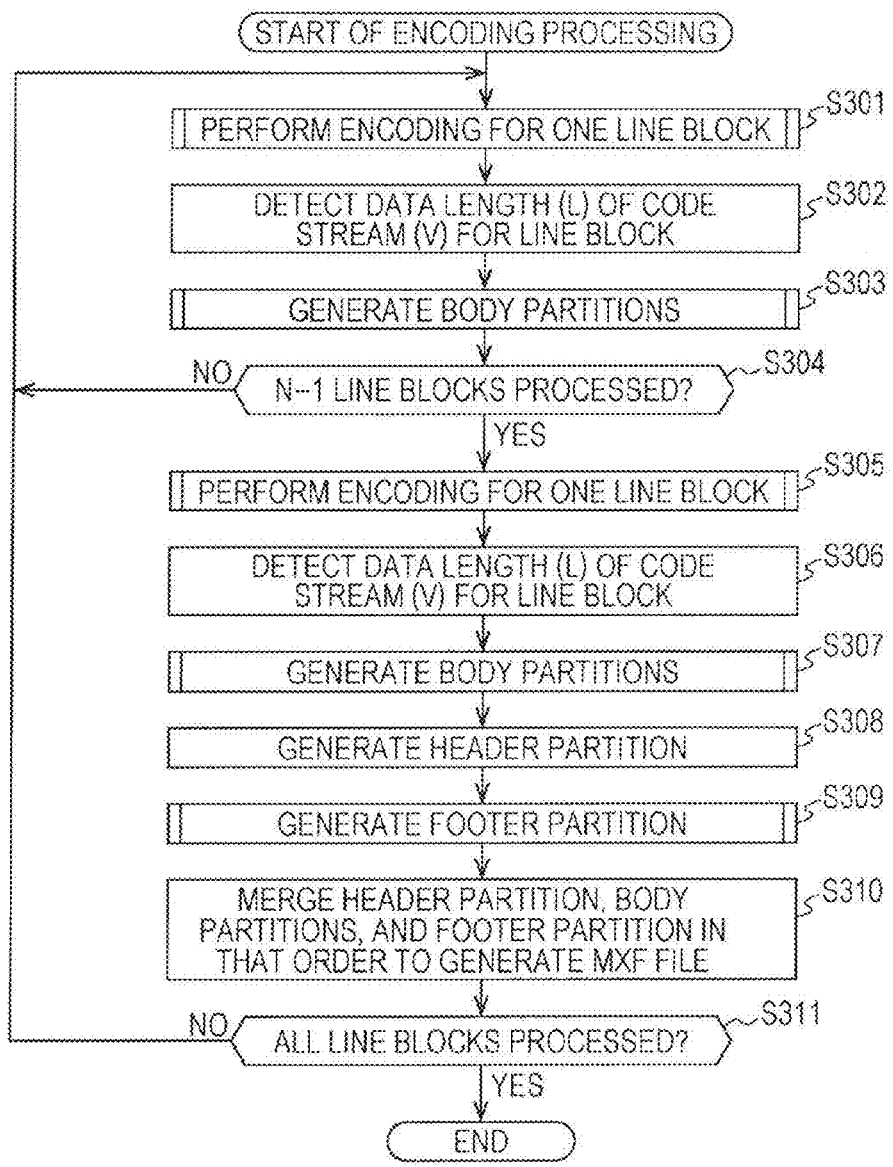
FIG. 25 is a flowchart illustrating another example of the flow of the encoding processing.
Figure 26:
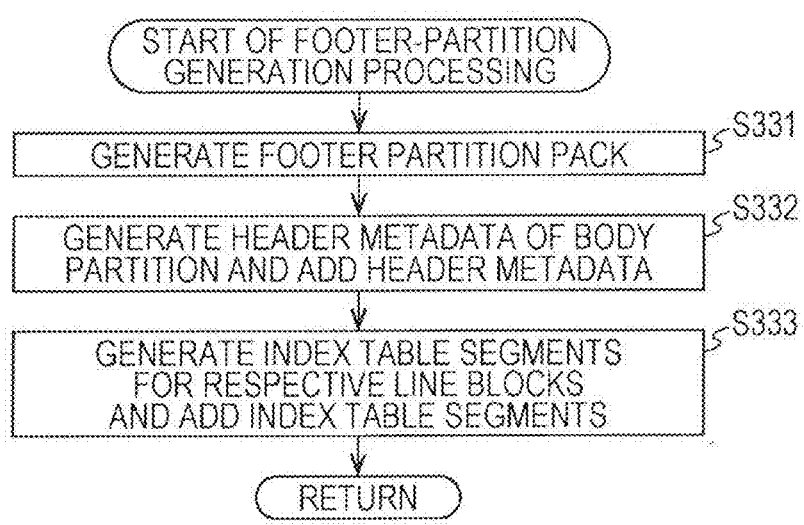
FIG. 26 is a flowchart illustrating yet another example of the flow of the footer-partition generation processing.

Upon generation of the footer partition with the low-delay data structure as described above, the footer-partition generating unit 133 ends the footer-partition generation processing and the process returns to FIG. 25.

As a result of performing the processes as described above, the line-block encoder 101 can generate encoded data (a code stream) by encoding image data with low delay. The MXF-file generator 102 can wrap the encoded data (the code stream) for N line blocks into one MXF file.

Accordingly, the image encoding apparatus 100 can achieve a higher degree of freedom and a lower delay with respect to transmission of data, such as image and audio data.

[Body Partition Omission 3]

Thus, when encoded data (a code stream) for N line blocks is wrapped into one MXF file, the third body partition (i.e., the body partition containing the header metadata) may also be omitted as described above with reference to FIGS. 18A to 20.

In this case, the body-partition generating unit 132 omits the third body partition (i.e., the body partition containing the header metadata) of the Nth line block (i.e., the last line block). The footer-partition generating unit 133 then adds the omitted header metadata (i.e., the omitted header metadata of the Nth (the last) line block) to the end of the footer partition pack.

That is, in this case, the footer-partition generating unit 133 generates a footer partition (containing the header metadata and an index table segment) having a structure that is similar to the structure illustrated in FIG. 13C. However, this header metadata contains the contents of the header metadata of the body partition.

With this arrangement, the MXF-file generator 102 can reduce the amount of information of the MXF file.

[Body Partition Omission 4]

When encoded data (a code stream) for N line blocks is wrapped into one MXF file, not only the third body partition (i.e., the body partition containing the header metadata) but also the second body partition (i.e., the body partition containing the index table segment) may also be omitted (i.e., may not be added) as described above with reference to FIGS. 21 to 23.

In this case, the body-partition generating unit 132 also omits the second body partition (i.e., the body partition containing the index table segment) and the third body partition (i.e., the body partition containing the header metadata) of the Nth (the last) line block. The footer-partition generating unit 133 then adds the omitted header metadata (i.e., the header metadata of the Nth (the last) line block) to the end of the footer partition pack and adds the omitted index table segment (i.e., the index table segment of the Nth (the last) line block) to the header metadata.

That is, in this case, the footer partition generator 133 generates a footer partition (containing header metadata and index table segments) having a structure that is similar to the structure illustrated in FIG. 13C. However, this header metadata contains the contents of the header metadata of the body partition and the index table segment contains the contents of the index table segment of the body partition.

With this arrangement, the MXF-file generator 102 can further reduce the amount of information of the MXF file.

As in the examples described above, the MXF-file generator 102 generates various body partitions for each line block. Thus, the MXF-file generator 102 can wrap encoded data for an arbitrary number of line blocks into one MXF file. Thus, the MXF-file generator 102 can wrap encoded data for a unit smaller than a picture into one MXF file. Accordingly, the MXF-file generator 102 can generate an MXF file without excessively increasing the delay time (i.e., with lower delay).

Accordingly, the image encoding apparatus 100 can achieve a higher degree of freedom and a lower delay with respect to transmission of data, such as image and audio data.

2. Second Embodiment

Image Decoding Apparatus

Figure 27:
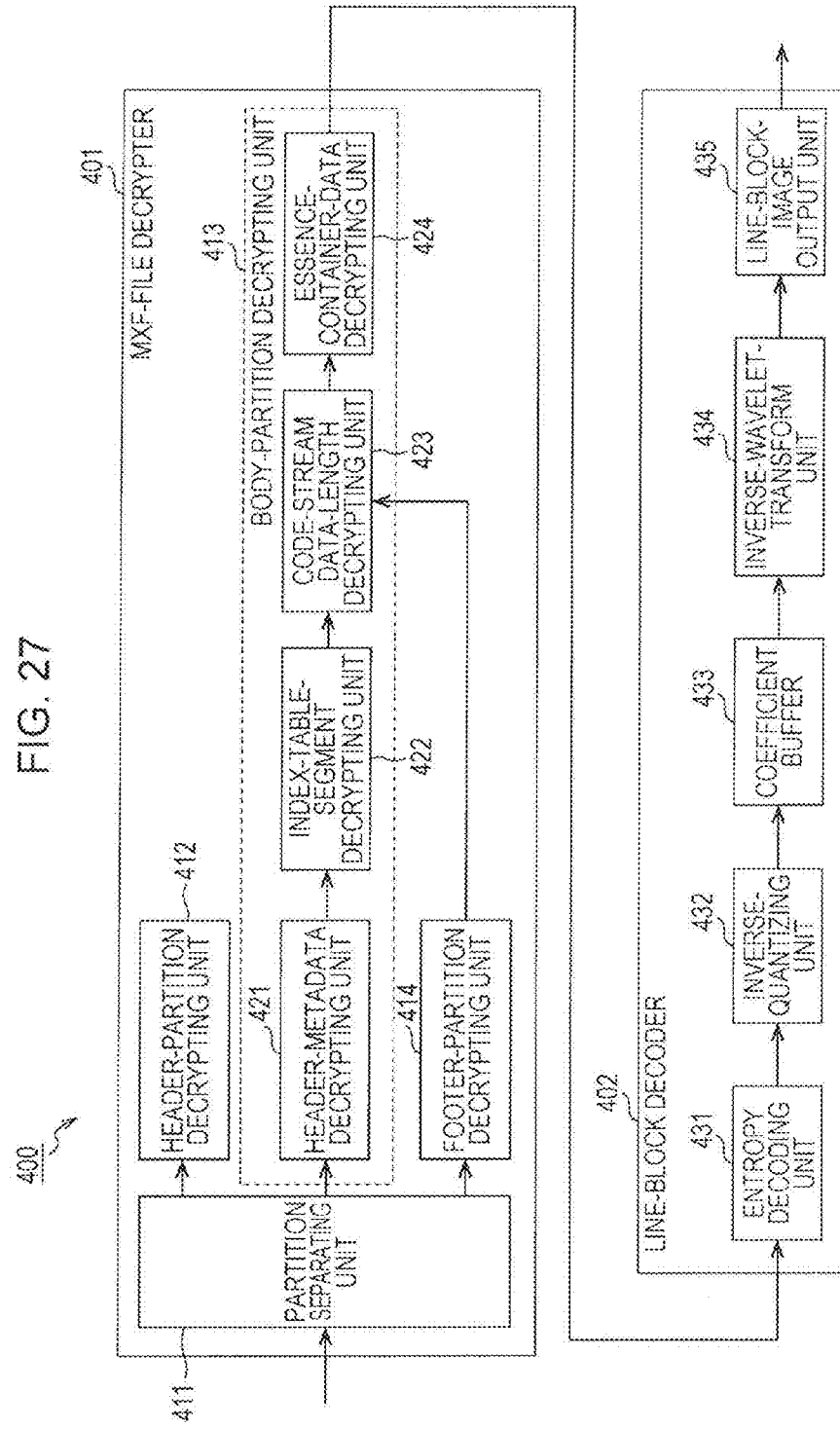
FIG. 27 is a block diagram illustrating a major configuration example of an image decoding apparatus.

FIG. 27 is a block diagram illustrating a major configuration example of an image decoding apparatus. An image decoding apparatus 400 illustrated in FIG. 27 is an image processing apparatus corresponding to the image encoding apparatus 100 illustrated in FIG. 1. That is, the image decoding apparatus 400 obtains an MXF file generated and transmitted by the image encoding apparatus 100 and correctly decrypts the MXF file to thereby extract encoded data (a code stream) generated by the image encoding apparatus 100. The image decoding apparatus 400 correctly decodes the extracted encoded data (code stream) for each line block by using a method, which corresponds to the encoding of the image encoding apparatus 100, to thereby generate decoded image data for each line block and outputs the decoded image data.

As illustrated in FIG. 27, the image decoding apparatus 400 has an MXF-file decrypter 401 and a line-block decoder 402.

The MXF-file decrypter 401 obtains an MXF file transmitted from the image encoding apparatus 100, correctly decrypts the obtained MXF file, and extracts encoded data (a code stream) for one or more line blocks, the encoded data being contained in the MXF file. The MXF-file decrypter 401 supplies the extracted encoded data for each line block to the line-block decoder 402.

The line-block decoder 402 decrypts the encoded data for each line block with low delay, the encoded data being supplied from the MXF-file decrypter 401. More specifically, the line-block decoder 402 decodes the encoded data for each line block by using a method, which corresponds to the encoding of the line-block encoder 101, to thereby generate decoded image data for each line block and outputs the decoded image data.

Details of the individual units will be described below.
[MXF-File Decrypter]

The MXF-file decrypter 401 obtains the MXF file transmitted from the image encoding apparatus 100 and decrypts the MXF file. As described above, the image encoding apparatus 100 generates body partitions for each line block and wraps encoded data for an arbitrary number of line blocks into one MXF file. Thus, the MXF-file decrypter 401 can extract the encoded data (the code stream) for each block from the MXF file. Accordingly, the MXF-file decrypter 401 can extract the encoded data (the code stream) with lower delay.

With this arrangement, encoded data (a code stream) that is a smaller unit than a picture can be wrapped into an MXF file. Thus, it is possible to reduce the amount of memory in which the MXF file obtained by the MXF-file decrypter 401 is held and it is also possible to suppress an increase in cost.

As illustrated in FIG. 27, the MXF-file decrypter 401 includes a partition separating unit 411, a header-partition decrypting unit 412, a body-partition decrypting unit 413, and a footer-partition decrypting unit 414.

The partition separating unit 411 obtains an MXF file transmitted from the image encoding apparatus 100 and decrypts the MXF file to separate the MXF file into the partitions. The partition separating unit 411 supplies the separated header partition to the header-partition decrypting unit 412. The partition separating unit 411 supplies the separated body partitions to the body-partition decrypting unit 413. The partition separating unit 411 further supplies the separated footer partition to the footer-partition decrypting unit 414.

The header-partition decrypting unit 412 decrypts the supplied header partition.

By using the result of header-partition decryption performed by the header-partition decrypting unit 412 and the result of the footer-partition decryption performed by the footer-partition decrypting unit 414, the body-partition decrypting unit 413 decrypts the supplied body partitions to extract the encoded data (the code stream) for each line block. The body-partition decrypting unit 413 supplies the extracted encoded data for each line block to the line-block decoder 402 for decoding.

The footer-partition decrypting unit 414 decrypts the supplied footer partition.
[Body-Partition Decrypting Unit]

As illustrated in FIG. 27, the body-partition decrypting unit 413 includes a header-metadata decrypting unit 421, an index-table-segment decrypting unit 422, a code-stream data-length decrypting unit 423, and an essence-container-data decrypting unit 424.

The header-metadata decrypting unit 421 decrypts the third body partition containing the body partition pack and the header metadata, the third body partition being included in the body partitions supplied from the partition separating unit 411, to thereby extract the header metadata from the body partition. The header-metadata decrypting unit 421 supplies the extracted header metadata to the index-table-segment decrypting unit 422 in conjunction with the body partitions supplied from the partition separating unit 411.

The index-table-segment decrypting unit 422 decrypts the second body partition containing the body partition pack and the index table segment, the second body partition being included in the body partitions supplied from the partition separating unit 411, to thereby extract the index table segment from the second body partition. The index-table-segment decrypting unit 422 supplies the extracted index table segment to the code-stream data-length decrypting unit 423 in conjunction with the body partitions and the header metadata.

On the basis of the information contained in the body partitions and the index table segment supplied from the index-table-segment decrypting unit 422, the code-stream data-length decrypting unit 423 decrypts L of the KLV structure of the essence container data, i.e., the data length of the code stream for each line block (e.g., an actual data length, such as 100 bytes or 800 bits). The code-stream data-length decrypting unit 423 supplies the decrypted data length to the essence-container-data decrypting unit 424 in conjunction with the body partitions, the header metadata, and the index table segment.

On the basis of the header metadata, the index table segment, and so on, the essence-container-data decrypting unit 424 decrypts KLV of the essence container data and extracts the encoded data for each line block from the essence container data. The essence-container-data decrypting unit 424 supplies the extracted encoded data for each line block to the line-block decoder 402.

[Line-Block Decoder]

The line-block decoder 402 will be described next. As illustrated in FIG. 27, the line-block decoder 402 includes an entropy decoding unit 431, an inverse-quantizing unit 432, a coefficient buffer 433, an inverse-wavelet-transform unit 434, and a line-block-image output unit 435.

By using a method corresponding to the encoding system of the entropy encoding unit 127, the entropy decoding unit 431 performs entropy decoding on encoded data for each line block, the encoded data being supplied from the MXF-file decrypter 401, to generate coefficient data for each line block. The entropy decoding unit 431 supplies the generated coefficient data for each line block to the inverse-quantizing unit 432.

The inverse-quantizing unit 432 executes inverse-quantization processing, which corresponds to the quantization processing performed by the quantizing unit 126, on the coefficient data supplied from the entropy decoding unit 431. The inverse-quantizing unit 432 supplies the inverse-quantized coefficient data to the coefficient buffer 433, which stores the coefficient data.

The inverse-wavelet-transform unit 434 reads, from the coefficient buffer 433, coefficient data to be inverse-wavelet-transformed and performs inverse-wavelet-transform processing on the coefficient data to generate decoded image data, as appropriate. The inverse-wavelet-transform unit 434 supplies the generated decoded image data to the line-block-image output unit 435.

The line-block-image output unit 435 holds the decoded image data supplied from the inverse-wavelet-transform unit 434 and outputs, for each line block, the decoded image data to outside of the image decoding apparatus 400. For example, the decoded image data is supplied to a display unit (not illustrated) so that a decoded image is displayed, is stored in a recording medium (not illustrated), such as hard disk or a semiconductor memory, or is supplied to an image processing apparatus (not illustrated) so as to be subjected to arbitrary image processing.

As described above, the line-block decoder 402 can decode encoded data for each line block. Thus, the line-block decoder 402 can decode encoded data with lower delay to generate decoded image data.

When the delay time increases excessively as a result of the MXF file decryption performed by the MXF-file decrypter 401, there is a possibility that the low-delay processing performed by the line-block decoder 402 is wasted. However, the MXF-file decrypter 401 can decrypt the MXF file to extract encoded data without an excessive increase in the delay time, as described above. That is, the MXF-file decrypter 401 can perform processing so that the low-delay processing performed by the line-block decoder 402 is not undesirably inhibited.

Accordingly, the image decoding apparatus 400 can achieve a higher degree of freedom and a lower delay with respect to transmission of data, such as image and audio data.

[Flow of Decoding Processing]

Next, a description will be given of flows of the respective processing executed by the image decoding apparatus 400 as described above. First, an example of the flow of the decoding processing executed by the image decoding apparatus 400 will be described with reference to a flowchart illustrated in FIG. 28.

Figure 28:
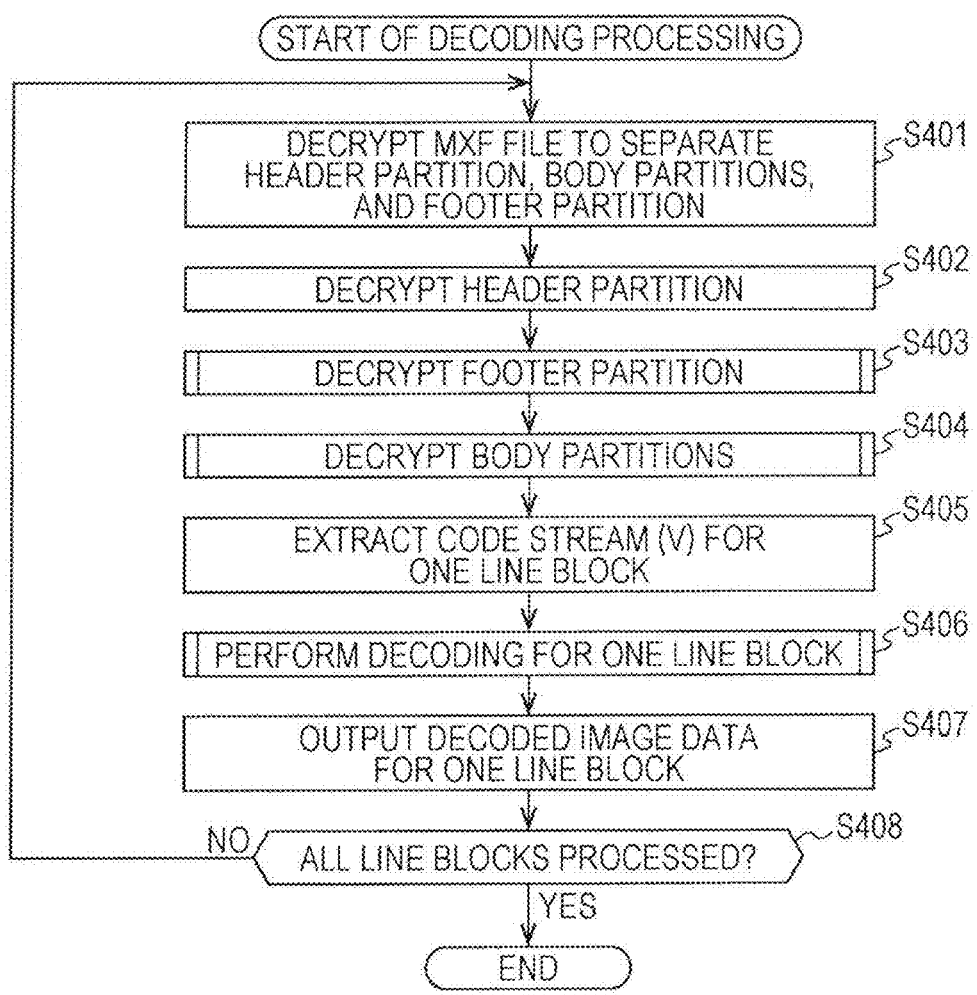
FIG. 28 is a flowchart illustrating an example of a flow of decoding processing.

The image decoding apparatus 400 executes decoding processing illustrated in FIG. 28, each time encoded data for one picture is input.

When the decoding processing is started, in step S401, the partition separating unit 411 obtains a transmitted MXF file and decrypts the MXF file to separate the header partition, the body partitions, and the footer partition.

In step S402, the header-partition decrypting unit 412 decrypts the header partition separated in step S401.

In step S403, the footer-partition decrypting unit 414 decrypts the footer partition separated in step S401.

In step S404, the body-partition decrypting unit 413 decrypts the body partitions separated in step S401.

When the individual partitions are decrypted as described above, the process proceeds to step S405 in which the essence-container-data decrypting unit 424 extracts a code stream for one line block from the MXF file (the essence container data).

In step S406, the line-block decoder 402 decodes the encoded data for one line block, the encoded data being extracted in step S405, to generate decoded image data for one line block.

In step S407, the line-block-image output unit 435 outputs the decoded image data for one line block, the decoded image data being generated in the process in step S406, to outside of the image decoding apparatus 400.

In step S408, the line-block-image output unit 435 determines whether or not all line blocks have been processed with respect to the picture to be processed (the picture of interest). When it is determined that an unprocessed line block exists with respect to the picture of interest, the process returns to step S401 in which the line-block-image output unit 435 repeats the subsequent processes. That is, the partition separating unit 411 obtains a new MXF file and separates the partitions thereof.

Thus, the image decoding apparatus 400 executes the processes in steps S401 to S408 on each MXF file (each line block). When it is determined in step S408 that all line blocks of the picture of interest have been processed, the line-block-image output unit 435 that have output the decoded image data of all line blocks of the picture of interest ends the decoding processing.

[Flow of Footer-Partition Decryption Processing]

Figure 29:
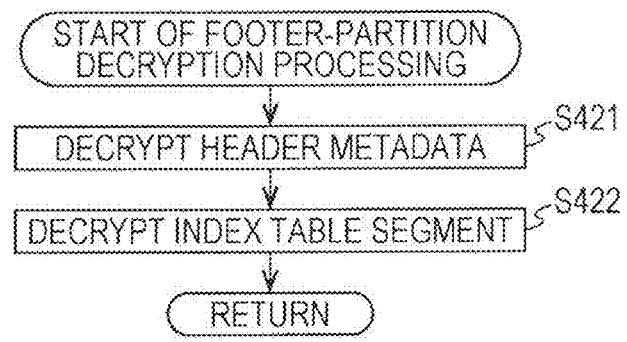
FIG. 29 is a flowchart illustrating an example of a flow of footer-partition decryption processing.

Next, an example of the flow of the footer-partition decryption processing executed in step S403 in FIG. 28 will be described with reference to a flowchart illustrated in FIG. 29.

Upon start of the footer-partition decryption processing, in step S421, the footer-partition decrypting unit 414 decrypts the header metadata contained in the footer partition. In step S422, the footer-partition decrypting unit 414 decrypts the index table segment contained in the footer partition.

Upon completion of the process in step S422, the footer-partition decrypting unit 414 ends the footer-partition decryption processing and the process returns to FIG. 28.

As illustrated in FIG. 13C, the footer partition contains no redundant element, has a low-delay data structure, and has a small number of elements. Thus, the footer-partition decrypting unit 414 can easily decrypt the footer partition as described above.

[Flow of Body-Partition Decryption Processing]

Figure 30:
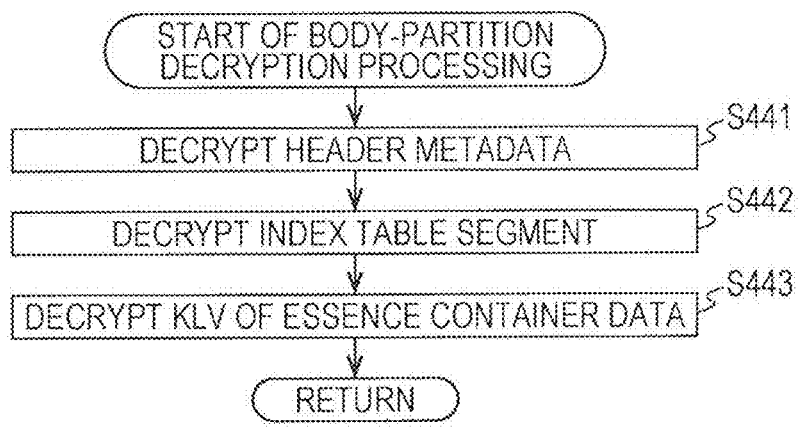
FIG. 30 is a flowchart illustrating an example of a flow of body-partition decryption processing.

Next, an example of the flow of the body-partition decryption processing executed in step S404 in FIG. 28 will be described with reference to a flowchart illustrated in FIG. 30.

Upon start of the body-partition decryption processing, in step S441, the header-metadata decrypting unit 421 in the body-partition decrypting unit 413 decrypts the header metadata contained in the third body portion.

In step S442, the index-table-segment decrypting unit 422 decrypts the index table segment contained in the second body partition.

In step S443, the code-stream data-length decrypting unit 423 and the essence-container-data decrypting unit 424 decrypt KLV of the essence container data contained in the first body partition.

Upon completion of the process in step S443, the essence-container-data decrypting unit 424 ends the body-partition decryption processing and the process returns to FIG. 28. As illustrated in FIG. 135, the body partitions contain no redundant element, have a low-delay data structure, and have a small number of elements. Thus, the body-partition decrypting unit 413 can easily decrypt the body partition as described above.

[Flow of Line-Block Decoding Processing]

Figure 31:
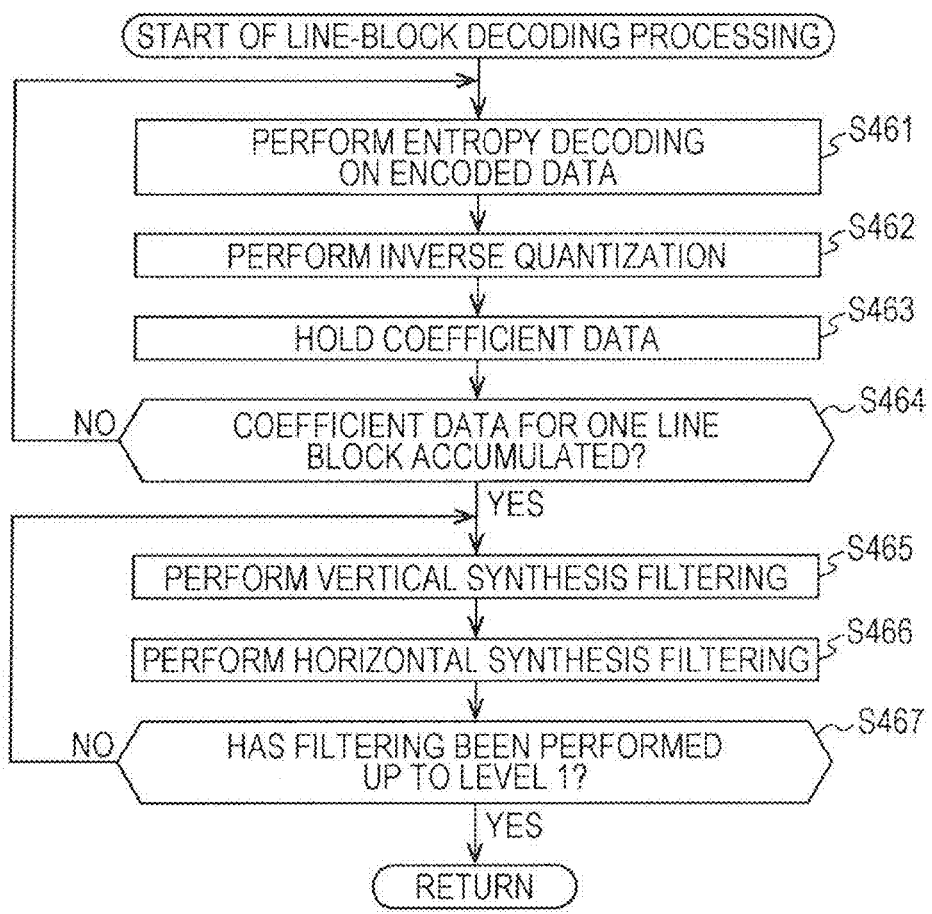
FIG. 31 is a flowchart illustrating an example of a flow of line-block decoding processing.

Next, an example of the flow of the line-block decoding processing executed in step S406 in FIG. 28 will be described with reference to a flowchart illustrated in FIG. 31.

Upon start of the line-block decoding processing, in step S461, the entropy decoding unit 431 performs entropy decoding on the encoded data for one line block, the encoded data being extracted from the MXF file by the MXF-file decrypter 401, by using a method corresponding to the encoding system of the encoding performed by the entropy encoding unit 127.

In step S462, by using a method corresponding to the quantization performed by the quantizing unit 126, the inverse-quantizing unit 432 performs inverse quantization on coefficient data generated by performing entropy decoding on the encoded data in the process in step S461.

In step S463, the coefficient buffer 433 holds the coefficient data inverse-quantized in step S462.

In step S464, the coefficient buffer 433 determines whether or not coefficient data for one line block are accumulated. When the coefficient buffer 433 determines that coefficient data for one line block is not accumulated, i.e., is not entropy-decoded, the process returns to step S461.

The processes in steps S461 to S464 are repeatedly executed. When the coefficient buffer 433 determines in step S464 that coefficient data for one line block is accumulated, the process proceeds to step S465.

In step S465, the inverse-wavelet-transform unit 434 reads the coefficient data for one line block, the coefficient data being stored in the coefficient buffer 433, and performs vertical synthesis filtering, which performs synthesis filter processing in the vertical direction, on the read coefficient data. As a result, high-frequency components and low-frequency components decomposed in the vertical direction are combined together.

In step S466, the inverse-wavelet-transform unit 434 performs horizontal synthesis filtering, which performs synthesis filter processing in the horizontal direction, on the result of the process in step S465. As a result, high-frequency components and low-frequency components decomposed in the horizontal direction are combined together.

In step S467, the inverse-wavelet-transform unit 434 determines whether or not the synthesis filtering has been performed up to level 1. Upon determining that the synthesis processing has not been performed up to level 1, the process returns to step S465.

That is, with respect to all decomposition levels, the inverse-wavelet-transform unit 434 performs vertical synthesis filtering and horizontal synthesis filtering to generate decoded image data.

In step S467, upon determining that the filtering has been performed up to level 1, the inverse-wavelet-transform unit 434 ends the line-block decoding processing and the process returns to FIG. 28.

As a result of execution of the processes as described above, the MXF-file decrypter 401 can extract encoded data for each line block from the MXF file, without an increase in the delay time. The line-block decoder 402 can also decode the encoded data for each line block and can realize low-delay decoding processing.

Accordingly, the image decoding apparatus 400 can achieve a higher degree of freedom and a lower delay with respect to transmission of data, such as image and audio data.

[Body Partition Omission]

As described above in the first embodiment, the image encoding apparatus 100 may be configured so that the third body partition (i.e., the body partition containing the header metadata) is omitted (is not added), the last body partition is used as the second body partition (i.e., the body partition containing the index table segment), and instead the information of the header metadata that is omitted (that is not added) is contained in the header metadata contained in the footer partition.

In this case, the decoding processing, the footer partition processing, and the line-block decoding processing are executed as in the case described above.

The body-partition decryption processing, however is executed as described below.

[Flow of Body-Partition Decryption Processing]

Figure 32:
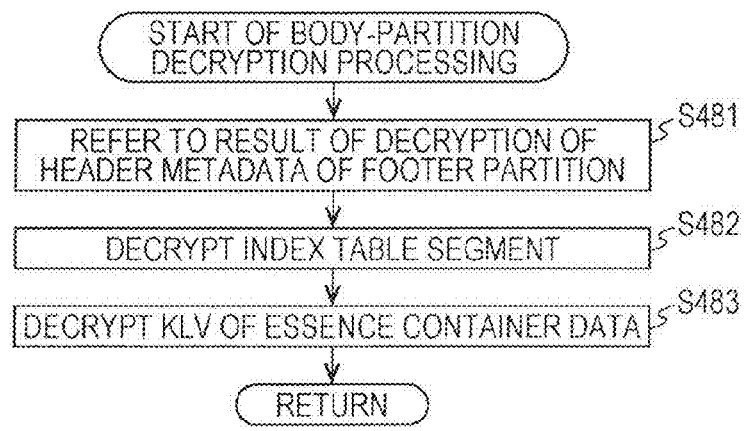
FIG. 32 is a flowchart illustrating another example of the flow of the body-partition decryption processing.

An example of the flow of the body-partition decryption processing in this case will now be described with reference to a flowchart illustrated in FIG. 32.

Upon start of the body-partition decryption processing, in step S481, the header-metadata decrypting unit 421 in the body-partition decrypting unit 413 refers to the result of the decryption of the header metadata of the footer partition (i.e., the result of the process in step S421), since the body partition containing the header metadata is omitted.

In step S482, the index-table-segment decrypting unit 422 decrypts the index table segment contained in the second body partition.

In step S483, the code-stream data-length decrypting unit 423 and the essence-container-data decrypting unit 424 decrypt KLV of the essence container data contained in the first body partition.

Upon completion of the processing in step S483, the essence-container-data decrypting unit 424 ends the body-partition decryption processing and the process returns to FIG. 28. Thus, when the body partition containing the header metadata is omitted, the image decoding apparatus 400 can also extract the decoded data from the MXF file to decode the encoded data. That is, the image decoding apparatus 400 can reduce the amount of information of the MXF file.

[Body Partition Omission 2]

As described above in the first embodiment, the image encoding apparatus 100 may be configured so that not only the third body partition (i.e., the body partition containing the header metadata) but also the second body partition (i.e., the body partition containing the index table segment) is omitted (i.e., is not added) and instead the pieces of information of the header metadata and the index table segment that are omitted (that are not added) are contained in the corresponding header metadata and index table segment contained in the footer partition.

In this case, the decoding processing, the footer partition processing, and the line-block decoding processing are executed as in the case described above.

The body-partition decryption processing, however is executed as described below.

[Flow of Body-Partition Decryption Processing]

Figure 33:
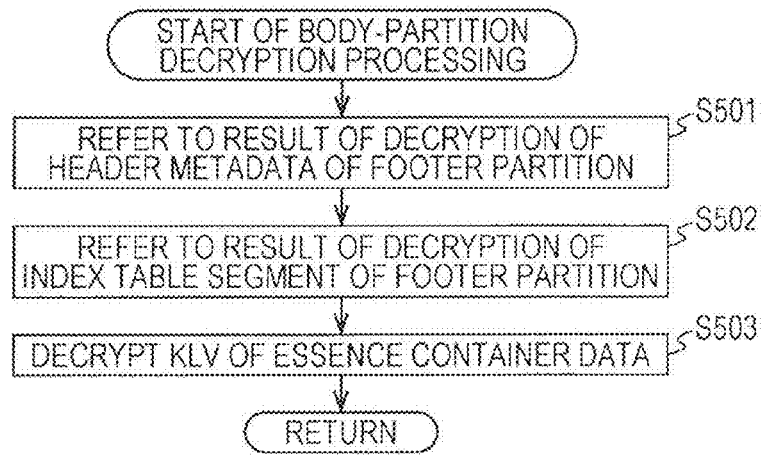
FIG. 33 is a flowchart illustrating yet another example of the flow of the body-partition decryption processing.

An example of the flow of the body-partition decryption processing in this case will now be described with reference to a flowchart illustrated in FIG. 33.

Upon start of the body-partition decryption processing, in step S501, the header-metadata decrypting unit 421 in the body-partition decrypting unit 413 refers to the result of the decryption of the header metadata of the footer partition (i.e., the result of the process in step S421), since the body partition containing the header metadata is omitted.

In step S502, the index-table-segment decrypting unit 422 refers to the result of the decryption of the index table segment of the footer partition (i.e., the result of the process in step S422), since the body partition containing the index table segment is omitted.

In step S503, the code-stream data-length decrypting unit 423 and the essence-container-data decrypting unit 424 decrypt KLV of the essence container data contained in the first body partition.

Upon completion of the process in step S503, the essence-container-data decrypting unit 424 ends the body-partition decryption processing and the process returns to FIG. 28. Thus, when not only the body partition containing the header metadata but also the body partition containing the index table segment is omitted, the image decoding apparatus 400 can also extract the decoded data from the MXF file to decode the encoded data. That is, the image decoding apparatus 400 can further reduce the amount of information of the MXF file.

[MXF File Containing Multiple Line Blocks]

As described above in the first embodiment, the image encoding apparatus 100 can also wrap encoded data for multiple line blocks into one MXF file.

In this case, the decoding processing is executed as described below.

[Flow of Decoding Processing]

An example of the flow of decoding processing when encoded data for multiple line blocks is wrapped into one MXF file will now be described with reference to a flowchart illustrated in FIG. 34.

It is assumed in this case that encoded data for N line blocks (N is an integer greater than or equal to 2) is wrapped into one MXF file.

When the decoding processing is started, in step S521, the partition separating unit 411 obtains a transmitted MXF file and decrypts the MXF file to separate the header partition, the body partitions, and the footer partition.

In step S522, the header-partition decrypting unit 412 decrypts the header partition separated in step S531.

In step S523, the footer-partition decrypting unit 414 decrypts the footer partition separated in step S521. Details of the footer-partition decryption processing are described below.

In step S524, the body-partition decrypting unit 413 decrypts the body partitions separated in step S521. The body-partition decryption processing is executed as in the case described above with reference to the flowchart illustrated in FIG. 30.

In step S525, the essence-container-data decrypting unit 424 extracts a code stream for one line block from the MXF file (the decrypted essence container data).

In step S526, the line-block decoder 402 decodes the encoded data for one line block, the encoded data being extracted in step S525, to generate decoded image data for one line block. The line-block decoding processing is executed as in the case described above with reference to the flowchart illustrated in FIG. 31.

In step S527, the line-block-image output unit 435 outputs the decoded image data for one line block, the decoded image data being generated in the process in step S526, and outputs the decoded image data to outside of the image decoding apparatus 400.

In step S528, the line-block-image output unit 435 determines whether or not decoded data for N−1 line blocks has been processed with respect to a picture to be processed (a picture of interest). When the amount of the processed encoded data has not reached N−1 line blocks, the process returns to step S524 in which the line-block-image output unit 435 repeats the subsequent processes.

The processes in steps S524 to S528 are executed for each line block. When the line-block-image output unit 435 determines in step S528 that coefficient data for N−1 line blocks has been processed, the process proceeds to step S529.

The individual units in the image decoding apparatus 400 execute the processes in steps S529 to S532 on the body partitions for the encoded data for the Nth line block, as in the processes in steps S524 to S527.

In step S533, the line-block-image output unit 435 determines whether or not all line blocks have been processed with respect to the picture to be processed (the picture of interest). When an unprocessed line block exists with respect to the picture of interest, the process returns to step S521 in which the line-block-image output unit 435 repeats the subsequent processes. That is, the partition separating unit 411 obtains a new MXF file and separates the partitions thereof.

Thus, the image decoding apparatus 400 executes the processes in steps S521 to S533 on each MXF file (each line block). When it is determined in step S533 that all line blocks of the picture of interest have been processed, the line-block-image output unit 435 that have output the decoded image data of all line blocks of the picture of interest ends the decoding processing.

[Flow of Footer-Partition Decryption Processing]

Next, an example of the flow of the footer-partition decryption processing executed in step S523 in FIG. 34 will be described with reference to a flowchart illustrated in FIG. 35.

Upon start of the footer-partition decryption processing, in step S551, the footer-partition decrypting unit 414 decrypts the header metadata contained in the footer partition. In step S552, the footer-partition decrypting unit 414 decrypts all of the index table segments for N line blocks, the index table segments being contained in the footer partition.

Figure 34:
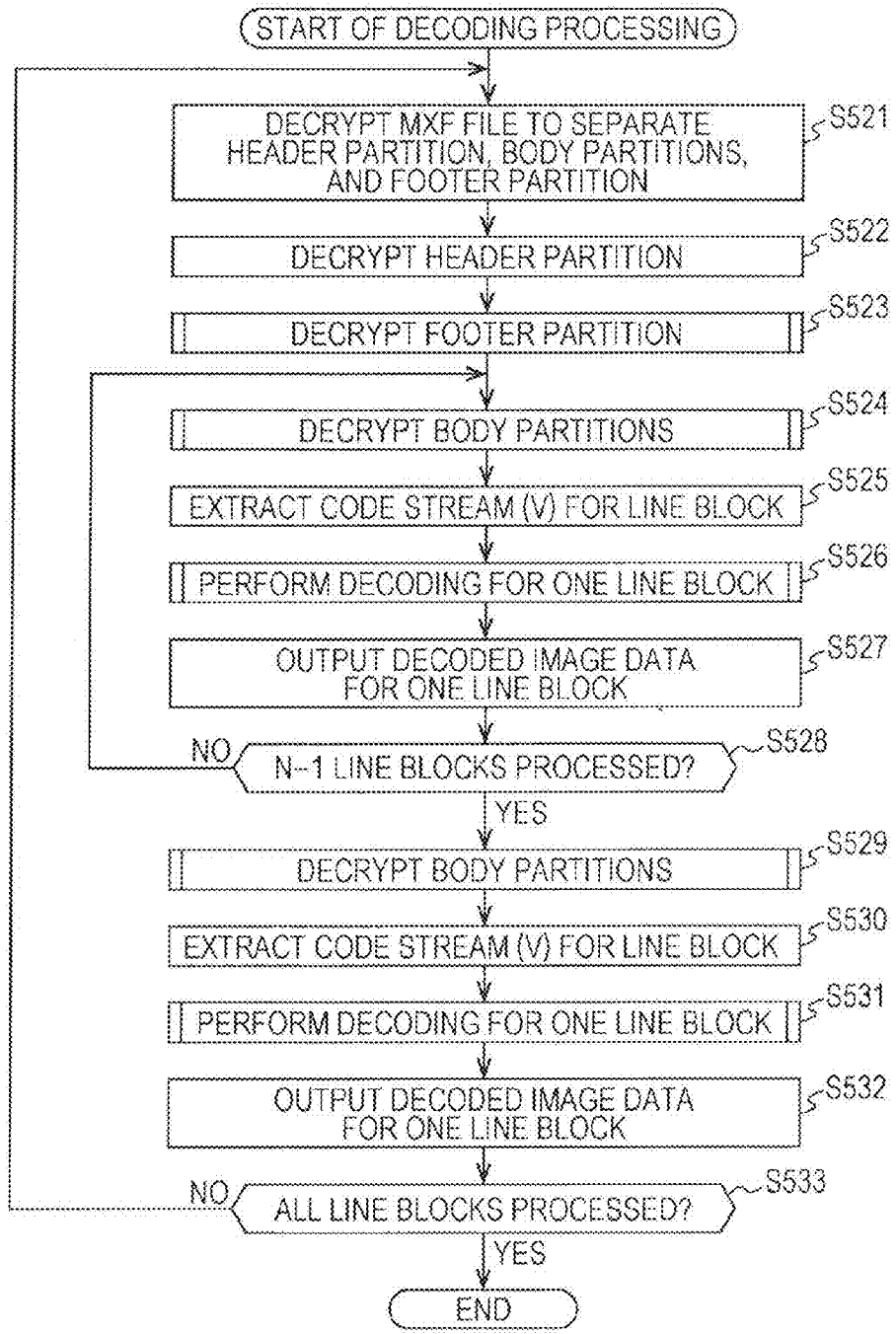
FIG. 34 is a flowchart illustrating another example of the flow of the decryption processing.
Figure 35:
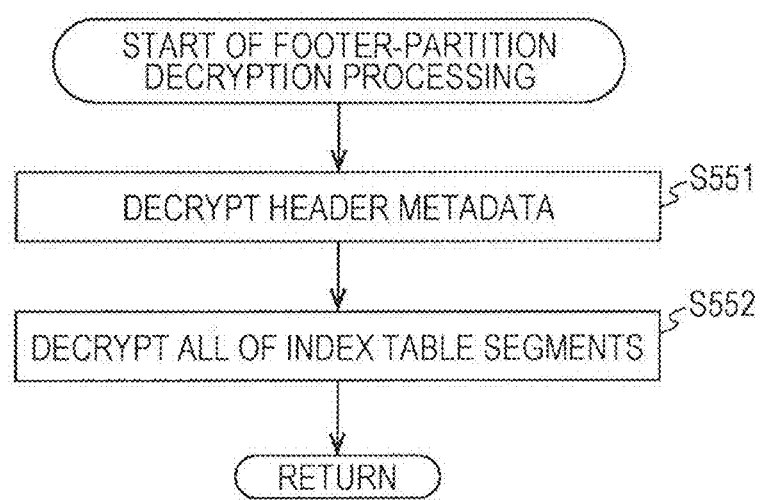
FIG. 35 is a flowchart illustrating another example of the flow of the footer-partition decryption processing.

Upon completion of the process in step S552, the footer-partition decrypting unit 414 ends the footer-partition decryption processing and the process returns to FIG. 34.

As described above, when encoded data (a code stream) for multiple line blocks is wrapped into one MXF file, the image decoding apparatus 400 can also achieve a higher degree of freedom and a lower delay with respect to transmission of data, such as image and audio data.

As described above, when encoded data (a code stream) for multiple line blocks is wrapped into one MXF file, the body partition containing the header metadata may be omitted with respect to only the encoded data for the Nth line block. In this case, the body-partition decrypting unit 413 can execute the body-partition decryption processing in step S529, as in the case described above with reference to the flowchart illustrated in FIG. 32.

As described above, when encoded data (a code stream) for multiple line blocks is wrapped into one MXF file, the body partition containing the header metadata and the body partition containing the index table segment may be omitted with respect to only the encoded data for the Nth line block. In this case, the body-partition decrypting unit 413 can execute the body-partition decryption processing in step S529, as in the case described above with reference to the flowchart illustrated in FIG. 33.

Thus, the image decoding apparatus 400 can reduce the amount of information of the MXF file.

[Overview of Transmission of MXF File]

Figure 36:
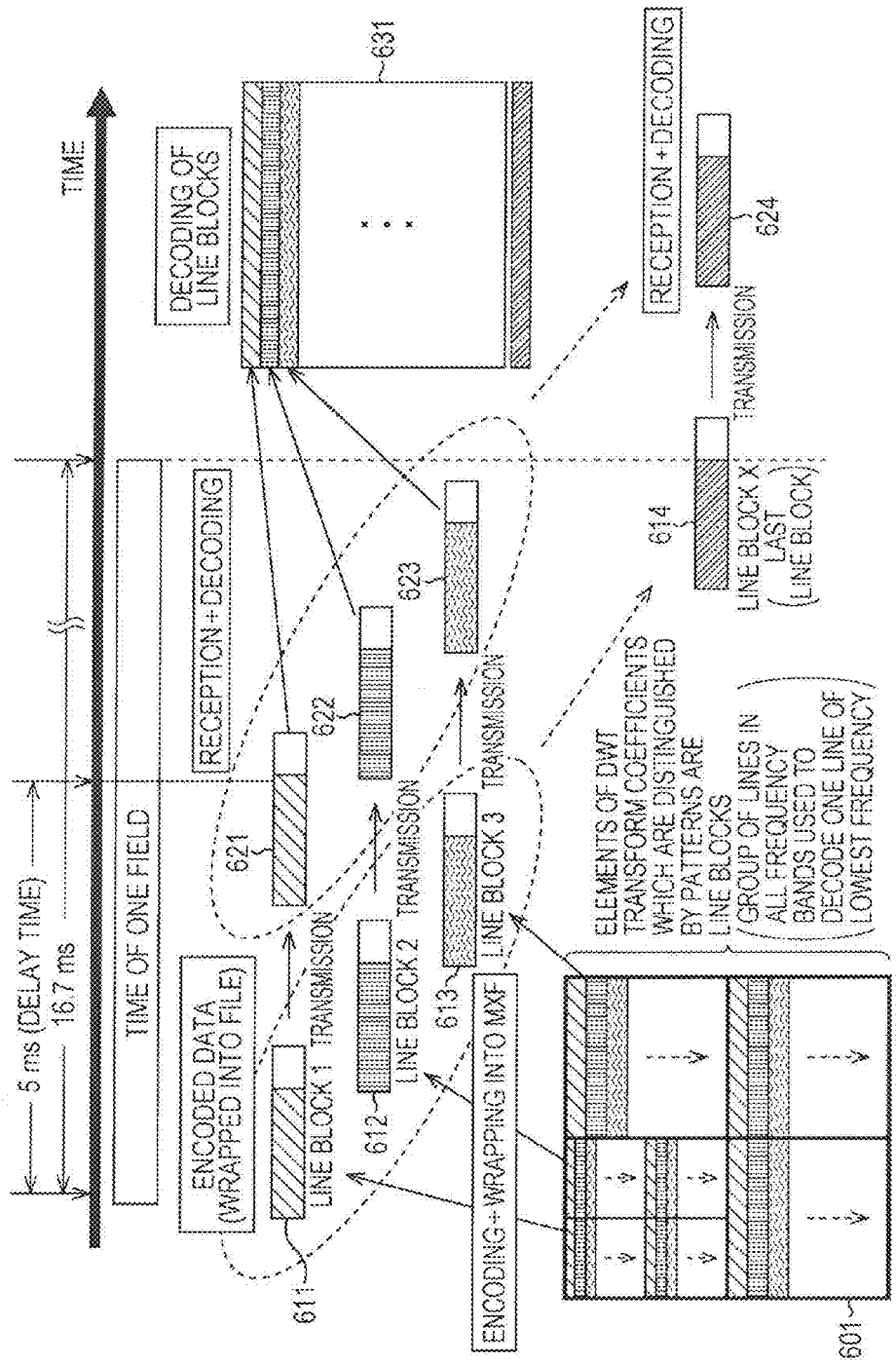
FIG. 36 is a flowchart illustrating an example of exchange of encoded data.

FIG. 36 depicts an operation involving line-block encoding and MXF conversion at the transmission side and MXF decryption and line-block decoding at the receiving side. For HDTV video (1080@59.94i), the time of one field is 16.7 msec. Thus, according to the present technology, the time taken until encoding, decoding, and display of a first line block are performed can be reduced to a time (indicated as 5 msec in FIG. 36) that is shorter than the time of one field.

Although a case in which the number of color components is one has been described above, the number of components is not limited thereto. For example, an input image may be constituted by multiple color components, as in the case of RGB and YCrCb. In this case, the generation of a quantization table and a representative-value table, quantization processing, and inverse-quantization processing may be performed on each of the color components as in the case described above. Those processes can be independently performed on each color component. Thus, the processes on each color component can be performed in parallel or can also be performed at timings that are different from each other.

Needless to say, each apparatus described above may also include an element other than those described above. For example, each apparatus may be implemented as equipment or a device using an image captured by an image capture element (a CMOS (complementary metal-oxide semiconductor) or CCD (charge-coupled device) sensor), a compression circuit used until an image captured by an image capture element is written to a memory, a digital still camera, a video camcorder, a medical image camera, a medical endoscope, a surveillance camera a digital-cinema shooting camera, a binocular image camera, a multi-lens camera, a memory reducing circuit for an LSI chip, an authoring tool on a PC, a software module therefore, or the like. Each apparatus may also be implemented as not only a single apparatus but also a system including multiple apparatuses.

3. Third Embodiment

Personal Computer

The above-described series of processes can be executed by hardware or software. For example, the above-described series of processes may be implemented by a personal computer as illustrated in FIG. 37.

Figure 37:
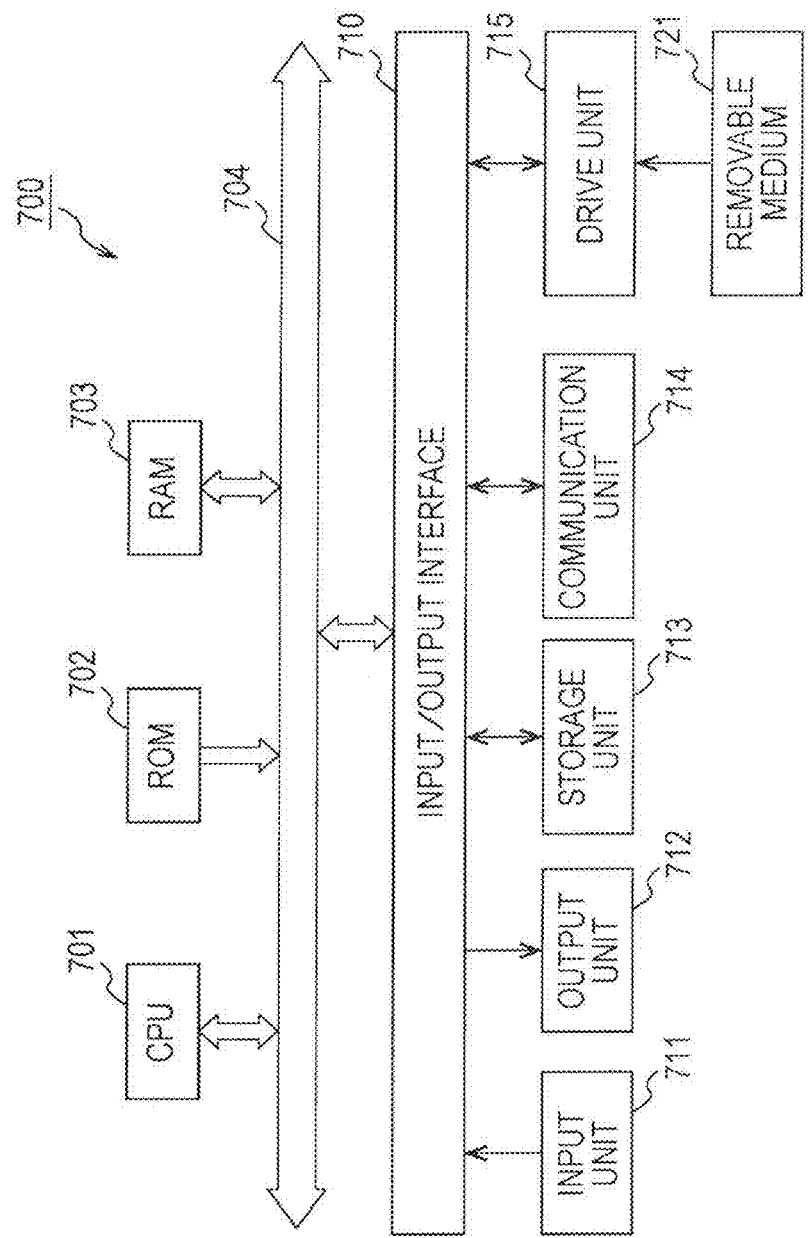
FIG. 37 is a block diagram illustrating a major configuration example of a personal computer.

In FIG. 37, a personal computer 700 includes a CPU (central processing u pit) 701, which executes various types of processing in accordance with a program stored in a ROM (read only memory) 702 or a program loaded from a storage unit 713 to a RAM (random access memory) 703. For example, data that the CPU 701 uses to execute the various types of processing is also stored in the RAM 703, as appropriate.

The CPU 701, the ROM 702, and the RAM 703 are also interconnected through a bus 704. The bus 704 is also connected to an input/output interface 710.

An input unit 711, an output unit 712, a storage unit 713, and a communication unit 714 are also connected to the input/output interface 710. Examples of the input unit 711 include a keyboard and a mouse. Examples of the output unit 712 include a display, such as a CRT (cathode ray tube) display or an LCD (liquid crystal display), and a speaker. Examples of the storage unit 713 include an SSD (solid state drive), such as a flash memory, and a hard disk. Examples of the communication unit 714 include an interface and a modem for a wired LAN (local area network) and a wireless LAN. The communication unit 714 performs communication processing through a network, including the Internet.

A drive 715 is also connected to the input/output interface 710, as appropriate, and a removable medium 721 is inserted into the drive 715, and a computer program read therefrom is installed to the storage unit 713, as appropriate. Examples of the removable medium include a magnetic disk, an optical disk, a magneto-optical disk, and a semiconductor memory.

When the above-described series of processing is executed by software, a program provided by the software is installed from the network to a recording medium.

For example, as illustrated in FIG. 37, the recording medium may be not only the removable medium 721 on which the program is recorded and which is distributed to a user to supply the program independently from the main unit of the apparatus, but also the ROM 702, the hard disk (included in the storage unit 713), or the like in which the program is recorded and which is distributed to a user while being pre-incorporated into the main unit of the apparatus. Examples of the removable medium 721 include a magnetic disk (such as a flexible disk), an optical disk (such as a CD-ROM (compact disc-read only memory) or DVD (digital versatile disc)), a magneto-optical disk (such as an MD (Mini Disc)), or a semiconductor memory.

The program executed by the computer may be a program that time-sequentially performs processes according to the order described hereinabove, may be a program that performs processes in parallel, or may be a program that performs processes at an arbitrary timing, for example, at the time of call of the program.

Herein, the steps describing the program recorded to the storage medium not only include processes that are time-sequentially performed according to the described order, but also include processes that are concurrently or individually executed without being time-sequentially processed.

The term "system" as used herein refers to an entirety constituted by multiple devices (apparatuses).

The configuration described above as being constituted by a single apparatus (or a single processor) may also be configured as multiple devices (or processors). The configuration described above as being constituted by multiple apparatuses (or processors) may also be integrated together to constitute one apparatus (or a processor). Needless to say, an element other than those described above may also be added to the configuration of each apparatus (or processor). Moreover, when the configuration and the operation of the entire system are substantially the same, part of the configuration of one apparatus (or processor) may be incorporated into the configuration of another apparatus (or processor). That is, embodiments according to the present disclosure are not limited to the above-described embodiments and various changes and modifications can be made thereto without departing from the spirit and scope of the present disclosure.

The present technology may have a configuration as described below.

(1) An image processing apparatus that processes encoded data obtained by encoding image data for each of line blocks obtained by dividing an image, the image processing apparatus including:
- a body-partition generating unit configured to generate body partitions of a file with a predetermined format for each piece of encoded data for one of the line blocks, the body partitions containing the encoded data; and
- a partition merging unit configured to merge the body partitions generated by the body-partition generating unit, a header partition containing header information, and a footer partition containing footer information to thereby generate the file.

(2) The image processing apparatus according to (1), wherein the body-partition generating unit generates one body partition containing the encoded data with respect to the file so as to wrap the encoded data for one line block into the file.

(3) The image processing apparatus according to (2), wherein the body-partition generating unit generates a body partition containing the encoded data, a body partition containing an index table segment, and a body partition containing header metadata in that order and arranges the body partitions in that order.

(4) The image processing apparatus according to (2), further including a footer-partition generating unit configured to generate the footer partition,
wherein the body-partition generating unit generates a body partition containing the encoded data and a body partition containing an index table segment in that order and arranges the body partitions in that order, and
the footer-partition generating unit generates a footer partition containing header metadata.

(5) The image processing apparatus according to (2), further including a footer-partition generating unit configured to generate the footer partition,
wherein the body-partition generating unit generates a body partition containing the encoded data, and
the footer-partition generating unit generates a footer partition containing header metadata and an index table segment.

(6) The image processing apparatus according to (1), wherein the body-partition generating unit generates body partitions containing the encoded data with respect to the file and arranges the body partitions so that the encoded data for the line blocks is wrapped into the file.

(7) The image processing apparatus according to (6), wherein the body-partition generating unit generates, for each line block, a body partition containing the encoded data, a body partition containing an index table segment, and a body partition containing header metadata in that order and arranges the body partitions in that order.

(8) The image processing apparatus according to (6), further including a footer-partition generating unit configured to generate the footer partition,
wherein, with respect to each line block except a last one of the line blocks, the body-partition generating unit generates a body partition containing the encoded data, a body partition containing an index table segment, and a body partition containing header metadata in that order and arranges the body partitions in that order;
with respect to the last line block, the body-partition generating unit generates a body partition containing the encoded data and a body partition containing the index table segment in that order and arranges the body partitions in that order; and
the footer-partition generating unit generates a footer partition containing header metadata of the last line block.

(9) The image processing apparatus according to (6), further including a footer-partition generating unit configured to generate the footer partition,
wherein, with respect to each line block except a last one of the line blocks, the body-partition generating unit generates a body partition containing the encoded data, a body partition containing an index table segment, and a body partition containing header metadata in that order and arranges the body partitions in that order;
with respect to the last line block, the body-partition generating unit generates a body partition containing the encoded data; and
the footer-partition generating unit generates a footer partition containing header metadata and an index table segment of the last line block.

(10) The image processing apparatus according to one of (1) to (9), further including an encoder configured to encode the image data for each line block,
wherein the body-partition generating unit generates the body partitions containing encoded data obtained by encoding the image data for each line block, the encoding being performed by the encoder.

(11) The image processing apparatus according to (10), wherein the encoder includes:
- a wavelet-transform unit configured to perform wavelet transform on the image data for each line block; and
- an entropy encoding unit configured to perform entropy encoding on coefficient data obtained by the wavelet transform performed by the wavelet-transform unit.

(12) The image processing apparatus according to (11), wherein the line block is a pixel data group for a number of lines that the wavelet-transform unit uses to generate coefficient data for one line of a subband of lowest-frequency components after the wavelet transform.

(13) The image processing apparatus according to one of (1) to (12), wherein the predetermined format is an MXF according to an SMPTE standard.

(14) An image processing method for an image processing apparatus that processes encoded data obtained by encoding image data for each of line blocks obtained by dividing an image, the image processing method including:
- causing a body-partition generating unit to generate body partitions of a file with a predetermined format for each piece of encoded data for one of the line blocks, the body partitions containing the encoded data; and
- causing a partition merging unit to merge the generated body partitions, a header partition containing header information, and a footer partition containing footer information to thereby generate the file.

(15) An image processing apparatus that processes encoded data obtained by encoding image data, the image processing apparatus including:
- a partition separating unit configured to separate the encoded data into partitions including body partitions of a file in a predetermined format, the body partitions containing the encoded data for one of line blocks obtained by dividing an image; and
- a body-partition decrypting unit configured to decrypt the body partitions to extract the encoded data for the line block, the body partitions being separated by the partition separating unit.

(16) The image processing apparatus according to (15), wherein the body-partition decrypting unit further decrypts a body partition containing an index table segment and a body partition containing header metadata, the body partitions being separated by the partition separating unit.

(17) The image processing apparatus according to (15), further including a decoder configured to decode the encoded data for one line block, the encoded data being decrypted and extracted by the body-partition decrypting unit.

(18) The image processing apparatus according to (17), wherein the decoder includes:
  an entropy decoding unit configured to perform entropy decoding on the encoded data to generate coefficient data; and
  an inverse-wavelet-transform unit configured to perform inverse wavelet transform on the coefficient data generated by the decoding performed by the entropy decoding unit.

(19) The image processing apparatus according to one of (15) to (18), wherein the predetermined format is an MXF according to an SMPTE standard.

(20) An image processing method for an image processing apparatus that processes encoded data obtained by encoding image data, the image processing method including:
  causing a partition separating unit to separate the encoded data into partitions including body partitions of a file in a predetermined format, the body partitions containing the encoded data for one of line blocks obtained by dividing an image; and
  a body-partition decrypting unit configured to decrypt the separated body partitions to extract the encoded data for the line block.

The present disclosure contains subject matter related to that disclosed in Japanese Priority Patent Application JP 2011-267561 filed in the Japan Patent Office on Dec. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus that processes encoded data obtained by encoding image data for each of line blocks obtained by dividing an image, the image processing apparatus comprising:
  a body-partition generating unit configured to generate body partitions of a file with a predetermined format for each piece of encoded data for one of the line blocks, the body partitions containing the encoded data, wherein one line block corresponds to coefficient data for one line of a subband of lowest frequency components; and
  a partition merging unit configured to merge the body partitions generated by the body-partition generating unit, a header partition containing header information, and a footer partition containing footer information to thereby generate the file.

2. The image processing apparatus according to claim 1, wherein the body-partition generating unit generates one body partition containing the encoded data with respect to the file so as to wrap the encoded data for one line block into the file.

3. The image processing apparatus according to claim 2, wherein the body-partition generating unit generates a body partition containing the encoded data, a body partition containing an index table segment, and a body partition containing header metadata in that order and arranges the body partitions in that order.

4. The image processing apparatus according to claim 2, further comprising a footer-partition generating unit configured to generate the footer partition,
  wherein the body-partition generating unit generates a body partition containing the encoded data and a body partition containing an index table segment in that order and arranges the body partitions in that order, and
  the footer-partition generating unit generates a footer partition containing header metadata.

5. The image processing apparatus according to claim 2, further comprising a footer-partition generating unit configured to generate the footer partition,
  wherein the body-partition generating unit generates a body partition containing the encoded data, and
  the footer-partition generating unit generates a footer partition containing header metadata and an index table segment.

6. The image processing apparatus according to claim 1, wherein the body-partition generating unit generates body partitions containing the encoded data with respect to the file and arranges the body partitions so that the encoded data for the line blocks is wrapped into the file.

7. The image processing apparatus according to claim 6, wherein the body-partition generating unit generates, for each line block, a body partition containing the encoded data, a body partition containing an index table segment, and a body partition containing header metadata in that order and arranges the body partitions in that order.

8. The image processing apparatus according to claim 6, further comprising a footer-partition generating unit configured to generate the footer partition,
  wherein, with respect to each line block except a last one of the line blocks, the body-partition generating unit generates a body partition containing the encoded data, a body partition containing an index table segment, and a body partition containing header metadata in that order and arranges the body partitions in that order;
  with respect to the last line block, the body-partition generating unit generates a body partition containing the encoded data and a body partition containing the index table segment in that order and arranges the body partitions in that order; and
  the footer-partition generating unit generates a footer partition containing header metadata of the last line block.

9. The image processing apparatus according to claim 6, further comprising a footer-partition generating unit configured to generate the footer partition,
  wherein, with respect to each line block except a last one of the line blocks, the body-partition generating unit generates a body partition containing the encoded data, a body partition containing an index table segment, and a body partition containing header metadata in that order and arranges the body partitions in that order;
  with respect to the last line block, the body-partition generating unit generates a body partition containing the encoded data; and
  the footer-partition generating unit generates a footer partition containing header metadata and an index table segment of the last line block.

10. The image processing apparatus according to claim 1, further comprising an encoder configured to encode the image data for each line block,
  wherein the body-partition generating unit generates the body partitions containing encoded data obtained by encoding the image data for each line block, the encoding being performed by the encoder.

11. The image processing apparatus according to claim 10, wherein the encoder comprises:
   a wavelet-transform unit configured to perform wavelet transform on the image data for each line block; and
   an entropy encoding unit configured to perform entropy encoding on coefficient data obtained by the wavelet transform performed by the wavelet-transform unit.

12. The image processing apparatus according to claim 11, wherein the line block is a pixel data group for a number of lines that the wavelet-transform unit uses to generate coefficient data for one line of a subband of lowest-frequency components after the wavelet transform.

13. The image processing apparatus according to claim 1, wherein the predetermined format is an MXF according to an SMPTE standard.

14. An image processing method for an image processing apparatus that processes encoded data obtained by encoding image data for each of line blocks obtained by dividing an image, the image processing method comprising:
   causing, by circuitry, a body-partition generating unit to generate body partitions of a file with a predetermined format for each piece of encoded data for one of the line blocks, the body partitions containing the encoded data, wherein one line block corresponds to coefficient data for one line of a subband of lowest frequency components; and
   causing, by circuitry, a partition merging unit to merge the generated body partitions, a header partition containing header information, and a footer partition containing footer information to thereby generate the file.

15. An image processing apparatus that processes encoded data obtained by encoding image data, the image processing apparatus comprising:
   a partition separating unit configured to separate the encoded data into partitions including body partitions of a file in a predetermined format, the body partitions containing the encoded data for one of line blocks obtained by dividing an image, wherein one line block corresponds to coefficient data for one line of a subband of lowest frequency components; and
   a body-partition decrypting unit configured to decrypt the body partitions to extract the encoded data for the line block, the body partitions being separated by the partition separating unit.

16. The image processing apparatus according to claim 15, wherein the body-partition decrypting unit further decrypts a body partition containing an index table segment and a body partition containing header metadata, the body partitions being separated by the partition separating unit.

17. The image processing apparatus according to claim 15, further comprising a decoder configured to decode the encoded data for one line block, the encoded data being decrypted and extracted by the body-partition decrypting unit.

18. The image processing apparatus according to claim 17, wherein the decoder comprises:
   an entropy decoding unit configured to perform entropy decoding on the encoded data to generate coefficient data; and
   an inverse-wavelet-transform unit configured to perform inverse wavelet transform on the coefficient data generated by the decoding performed by the entropy decoding unit.

19. The image processing apparatus according to claim 15, wherein the predetermined format is an MXF according to an SMPTE standard.

20. An image processing method for an image processing apparatus that processes encoded data obtained by encoding image data, the image processing method comprising:
   causing, by hardware, a partition separating unit to separate the encoded data into partitions including body partitions of a file in a predetermined format, the body partitions containing the encoded data for one of line blocks obtained by dividing an image, wherein one line block corresponds to coefficient data for one line of a subband of lowest frequency components; and
   decrypting the separated body partitions to extract the encoded data for the line block.

21. An image processing apparatus that processes encoded data obtained by encoding image data for each of line blocks obtained by dividing an image, the image processing apparatus comprising:
   a body-partition generating unit configured to generate body partitions of a file with a predetermined format for each piece of encoded data for one of the line Mocks, the body partitions containing the encoded data, wherein the body-partition generating unit generates a body partition containing the encoded data, a body partition containing an index table segment, and a body partition containing header metadata in that order and arranges the body partitions in that order; and
   a partition merging unit configured to merge the body partitions generated by the body-partition generating unit, a header partition containing header information, and a footer partition containing footer information to thereby generate the file.

22. An image processing method for an image processing apparatus that processes encoded data obtained by encoding image data for each of line blocks obtained by dividing an image, the image processing method comprising:
   causing, by circuitry, a body-partition generating unit to generate body partitions of a file with a predetermined format for each piece of encoded data for one of the line blocks, the body partitions containing the encoded data, wherein the body-partition generating unit generates a body partition containing the encoded data, a body partition containing an index table segment, and a body partition containing header metadata in that order and arranges the body partitions in that order; and
   causing, by circuitry, a partition merging unit to merge the generated body partitions, a header partition containing header information, and a footer partition containing footer information to thereby generate the file.

23. An image processing apparatus that processes encoded data obtained by encoding image data, the image processing apparatus comprising:
   a partition separating unit configured to separate the encoded data into partitions including body partitions of a file in a predetermined format, the body partitions containing the encoded data for one of line blocks obtained by dividing an image, and
   a body-partition decrypting unit configured to decrypt the body partitions to extract the encoded data for the line block, the body partitions being separated by the partition separating unit, wherein the body-partition decrypting unit further decrypts a body partition containing an index table segment and a body partition containing header metadata, the body partitions being separated by the partition separating unit.

24. An image processing method for an image processing apparatus that processes encoded data obtained by encoding image data, the image processing method comprising:

causing, by hardware, a partition separating unit to separate the encoded data into partitions including body partitions of a file in a predetermined format, the body partitions containing the encoded data for one of line blocks obtained by dividing an image, and decrypting the separated body partitions to extract the encoded data for the line block including further decrypting a body partition containing an index table segment and a body partition containing header metadata, the body partitions being separated by the partition separating unit.

* * * * *